United States Patent
Moore et al.

(10) Patent No.: US 11,608,266 B2
(45) Date of Patent: Mar. 21, 2023

(54) HYDROGEN GENERATION SYSTEMS

(71) Applicant: BayoTech, Inc., Albuquerque, NM (US)

(72) Inventors: Robert Charles Moore, Edgewood, NM (US); Herbert Lee Nigg, Los Ranchos, NM (US); Millicent Capstaff, Raeford, NC (US); Viswanath Krishnamoorthy, Albuquerque, NM (US); Ranko P. Bontchev, Albuquerque, NM (US)

(73) Assignee: BAYOTECH, INC., Albuquerque, NM (US)

( * ) Notice: Subject to any disclaimer, the term of this patent is extended or adjusted under 35 U.S.C. 154(b) by 81 days.

(21) Appl. No.: 16/821,618

(22) Filed: Mar. 17, 2020

(65) Prior Publication Data

US 2021/0292166 A1 Sep. 23, 2021

(51) Int. Cl.
*B01J 8/00* (2006.01)
*B01J 8/02* (2006.01)
(Continued)

(52) U.S. Cl.
CPC ............... *C01B 3/48* (2013.01); *B01J 15/00* (2013.01); *B01J 19/006* (2013.01);
(Continued)

(58) Field of Classification Search
CPC ..... B01J 8/00; B01J 8/02; B01J 8/0403; B01J 8/0407; B01J 8/0423; B01J 8/0446;
(Continued)

(56) References Cited

U.S. PATENT DOCUMENTS

| 4,134,908 A | 1/1979 | Steiner et al. |
| 5,032,365 A | 7/1991 | Aono et al. |

(Continued)

FOREIGN PATENT DOCUMENTS

| CA | 2511720 | 5/2006 |
| EP | 0 194 067 | 9/1986 |

(Continued)

OTHER PUBLICATIONS

PCT International Search Report and Written Opinion in International Application No. PCT/US2021/022481, dated Jun. 3, 2021, 10 pages.

(Continued)

*Primary Examiner* — Natasha E Young
(74) *Attorney, Agent, or Firm* — Fish & Richardson P.C.

(57) ABSTRACT

A method for producing hydrogen includes flowing a first gas along a bayonet flow path of a steam methane reformer (SMR) to produce a first product, including flowing the first gas through a foam disposed along the bayonet flow path; providing the first product produced in the SMR to an input of a water gas shift (WGS) reaction channel defined within a reaction tube of a WGS reactor; and flowing a second gas including the first product through the WGS reaction channel to produce a second product. Flowing the second gas includes flowing the second gas across a heat transfer material disposed in the WGS reaction channel to reduce the temperature of the flowing second gas; and flowing the second gas across a WGS catalyst disposed in the reaction channel.

19 Claims, 11 Drawing Sheets

(51) Int. Cl.
*B01J 8/04* (2006.01)
*B01J 8/06* (2006.01)
*B01J 15/00* (2006.01)
*B01J 19/00* (2006.01)
*B01J 19/24* (2006.01)
*C01B 3/38* (2006.01)
*C01B 3/48* (2006.01)

(52) U.S. Cl.
CPC ......... *B01J 19/0013* (2013.01); *B01J 19/242* (2013.01); *B01J 19/2415* (2013.01); *C01B 3/384* (2013.01); *B01J 2219/0004* (2013.01); *B01J 2219/00087* (2013.01); *B01J 2219/00099* (2013.01); *B01J 2219/00763* (2013.01); *C01B 2203/0233* (2013.01); *C01B 2203/0288* (2013.01); *C01B 2203/0833* (2013.01); *C01B 2203/1029* (2013.01); *C01B 2203/1058* (2013.01); *C01B 2203/1082* (2013.01)

(58) Field of Classification Search
CPC ...... B01J 8/0449; B01J 8/0461; B01J 8/0492; B01J 8/0496; B01J 8/06; B01J 8/062; B01J 8/065; B01J 8/067; B01J 15/00; B01J 15/005; B01J 19/00; B01J 19/0006; B01J 19/0013; B01J 19/0053; B01J 19/006; B01J 19/24; B01J 19/2415; B01J 19/242; B01J 19/248; B01J 19/2485; B01J 2208/00; B01J 2208/00008; B01J 2208/00017; B01J 2208/00106; B01J 2208/00168; B01J 2208/00309; B01J 2208/0053; B01J 2219/00; B01J 2219/00002; B01J 2219/00027; B01J 2219/0004; B01J 2219/00049; B01J 2219/00051; B01J 2219/00054; B01J 2219/00056; B01J 2219/00058; B01J 2219/0006; B01J 2219/00074; B01J 2219/00076; B01J 2219/00087; B01J 2219/00099; B01J 2219/00117; B01J 2219/00157; B01J 2219/00159; B01J 2219/00164; B01J 2219/00761; B01J 2219/00763; B01J 2219/24; B01J 2219/2402; B01J 2219/2409; B01J 2219/2411; B01J 2219/2412; B01J 2219/2418; B01J 2219/2419; B01J 2219/2425; B01J 2219/2427; B01J 2219/2432; B01J 2219/2433; B01J 2219/2434; C01B 3/00; C01B 3/02; C01B 3/32; C01B 3/34; C01B 3/36; C01B 3/38; C01B 3/384; C01B 3/40; C01B 3/48; C01B 2203/00; C01B 2203/02; C01B 2203/0205; C01B 2203/0227; C01B 2203/0233; C01B 2203/0266; C01B 2203/0277; C01B 2203/0283; C01B 2203/0288; C01B 2203/08; C01B 2203/0805; C01B 2203/0811; C01B 2203/0833; C01B 2203/0872; C01B 2203/0883; C01B 2203/0888; C01B 2203/0894; C01B 2203/10; C01B 2203/1005; C01B 2203/1029; C01B 2203/1041; C01B 2203/1047; C01B 2203/1052; C01B 2203/1058; C01B 2203/1082; C01B 2203/16; C01B 2203/1614; C01B 2203/80; C01B 2203/82

See application file for complete search history.

(56) References Cited

U.S. PATENT DOCUMENTS

| | | |
|---|---|---|
| 5,039,510 A | 8/1991 | Pinto |
| 5,199,961 A | 4/1993 | Ohsaki et al. |
| 5,429,809 A | 7/1995 | Stahl et al. |
| 5,639,431 A | 6/1997 | Shirasaki et al. |
| 5,876,469 A | 3/1999 | Moriya et al. |
| 6,180,846 B1 | 1/2001 | Dandekar et al. |
| 6,797,244 B1 | 9/2004 | Lesieur |
| 7,517,507 B2 | 4/2009 | Kuwabara et al. |
| 7,645,437 B1 | 1/2010 | Moore et al. |
| 8,235,361 B2 | 8/2012 | Feinstein |
| 8,889,588 B2 | 11/2014 | Moon et al. |
| 9,505,617 B2 | 11/2016 | Kolaczkowski et al. |
| 9,592,487 B2 * | 3/2017 | Ralston ............. B01J 8/062 |
| 9,662,637 B2 | 5/2017 | Qi et al. |
| 10,465,990 B2 | 11/2019 | Vernon |
| 10,472,236 B2 | 11/2019 | Farace et al. |
| 10,775,107 B2 | 9/2020 | Vernon |
| 10,894,244 B1 | 1/2021 | Moore et al. |
| 11,192,081 B2 | 12/2021 | Feinstein |
| 2002/0106539 A1 | 8/2002 | Chong et al. |
| 2002/0136677 A1 | 9/2002 | Sederquist et al. |
| 2002/0146359 A1 | 10/2002 | Lomax, Jr. et al. |
| 2005/0036921 A1 | 2/2005 | Nagasawa et al. |
| 2005/0155351 A1 | 7/2005 | Wunning et al. |
| 2010/0221619 A1 | 9/2010 | Fujihara et al. |
| 2011/0212375 A1 | 9/2011 | Taguchi et al. |
| 2011/0318660 A1 | 12/2011 | Mukai et al. |
| 2013/0164179 A1 | 6/2013 | Dong et al. |
| 2014/0093794 A1 | 4/2014 | Kita et al. |
| 2015/0376003 A1 | 12/2015 | Ralston et al. |
| 2016/0002035 A1 | 1/2016 | Ralston et al. |
| 2016/0282052 A1 | 9/2016 | Vernon |
| 2017/0021324 A1 * | 1/2017 | Blanchet ............. B23P 11/005 |
| 2017/0073227 A1 | 3/2017 | Dybkjaer et al. |
| 2019/0151813 A1 | 5/2019 | Mortensen et al. |
| 2021/0001297 A1 | 1/2021 | Feinstein |

FOREIGN PATENT DOCUMENTS

| | | |
|---|---|---|
| WO | WO 01/12310 | 2/2001 |
| WO | WO2017211884 | 12/2017 |
| WO | WO 2018/077969 | 5/2018 |
| WO | WO 2020/260589 | 12/2020 |
| WO | WO 2022/100899 | 5/2022 |

OTHER PUBLICATIONS

PCT International Search Report and Written Opinion in International Application No. PCT/US2021/022493, dated Jun. 3, 2021, 9 pages.
Corrected PCT International Search Report and Written Opinion in International Application No. PCT/US2021/022472, dated May 3, 2021, 8 pages.
PCT International Written Opinion in International Application No. PCT/US2021/022472, dated Apr. 8, 2021, 5 pages.
PCT International Search Report and Written Opinion in International Application No. PCT/US2021/022501, dated May 25, 2021, 9 pages.
Gancarczyk et al., "Metal Foams as Novel Catalyst Support in Environmental Processes," Catalysts, Jul. 5, 2019, 9:587 (13 pages).
Minette et al., "Pressure drop and heat transfer of ZoneFlowTM structured catalytic reactors and reference pellets for Steam Methane Reforming," Chemical Engineering Journal, Aug. 1, 2021, vol. 417, 128080, 51 pages.

* cited by examiner

HYDROGEN GENERATION SYSTEMS

BACKGROUND

Hydrogen generation reactions convert hydrocarbons, such as methane, into hydrogen gas. Hydrogen gas can be used, e.g., as fuel for vehicles.

SUMMARY

We describe here systems for energy-efficient, low-emission production of hydrogen gas (H2) from hydrocarbons. The systems include a steam methane reactor (SMR) having a bayonet flow path in which incoming reactant fluid flowing along the flow path is heated by transfer of recovered heat from outgoing fluid flowing along the flow path. Catalytic foam and heat transfer foam disposed along the bayonet flow path catalyze a hydrogen generation reaction in the SMR and facilitate heat transfer to the incoming reactant fluid. Product fluid from the SMR is provided to a water gas shift (WGS) reactor. The fluid flows across one or more WGS catalysts and one or more heat transfer materials disposed along a reaction channel in the WGS reactor. The WGS catalysts and heat transfer material catalyze a hydrogen generation reaction in the WGS and facilitate removal of heat generated by the exothermic WGS hydrogen generation reaction. Cooling fluid heated by heat from the WGS hydrogen generation reaction can be provided as input into the SMR. The use of heat transfer among fluid streams in the SMR enables energy efficient production of hydrogen to be achieved.

In a general aspect, a system for production of hydrogen includes a steam methane reformer (SMR) including an outer tube, wherein a first end of the outer tube is closed; and an inner tube disposed in the outer tube, wherein a first end of the inner tube is open. An SMR flow channel is defined within the inner tube and an annular space is defined between the outer tube and the inner tube. The flow channel is in fluid communication with the annular space. The SMR includes a foam disposed in the annular space between the outer tube and the inner tube. The system includes a water gas shift (WGS) reactor including a reaction tube, wherein a WGS reaction channel is defined within the reaction tube, and wherein the WGS reaction channel is in fluid communication with the SMR flow channel; a heat transfer material disposed in the WGS reaction channel; and a WGS catalyst disposed in the WGS reaction channel.

Embodiments can include one or any combination of two or more of the following features.

An outlet of the SMR flow channel is in fluid communication with an inlet of the WGS reaction channel.

The WGS reactor includes a housing, the reaction tube of the WGS reactor being disposed in the housing, and wherein a cooling fluid channel is defined between the housing and the reaction tube of the WGS reactor. An outlet of the cooling fluid channel is in fluid communication with an inlet of the annular space of the SMR. An inlet of the WGS reaction channel and an outlet of the cooling fluid channel are disposed at a first end of the WGS reactor. The WGS reactor includes a flow controller configured to control a flow rate of cooling fluid through the cooling fluid channel.

The foam of the SMR includes an SMR catalyst. The SMR catalyst is disposed on the foam of the SMR. The SMR catalyst is configured to catalyze an SMR hydrogen generation reaction in which hydrogen and carbon monoxide are produced. The SMR includes an outer heat exchange foam disposed in the annular space between the outer tube and the inner tube, wherein a distance between the outer heat exchange foam and a second end of the outer tube is less than a distance between the foam assembly and the second end of the outer tube.

The SMR includes an inner heat exchange foam disposed in the SMR flow channel.

A bayonet flow path through the SMR is defined from an inlet at a second end of the outer tube, along the annular space between the outer tube and the inner tube toward the first end of the outer tube, along the SMR flow channel, and to an outlet at a second end of the inner tube.

The WGS catalyst includes a foam including a WGS catalyst material. The WGS catalyst material includes a foam substrate, wherein the WGS catalyst material is disposed on the foam substrate.

The WGS catalyst includes: a first WGS catalyst disposed in the WGS reaction channel and configured to catalyze a hydrogen generation reaction in a first temperature range; and a second WGS catalyst disposed in the WGS reaction channel and configured to catalyze the hydrogen generation reaction in a second temperature range lower than the first temperature range. The heat transfer material is disposed in the WGS reaction channel between the first WGS catalyst and the second WGS catalyst.

The heat transfer material disposed in the WGS reaction channel includes a foam.

The system includes a furnace, wherein a portion of the SMR is disposed in the furnace. The first end of the outer tube of the SMR is disposed in the furnace. The system includes an external heat transfer material disposed on an outer surface of the outer tube of the SMR.

In a general aspect, combinable with the previous aspect, a method for producing hydrogen includes flowing a first gas along a bayonet flow path of a steam methane reformer (SMR) to produce a first product, including flowing the first gas through a foam disposed along the bayonet flow path; providing the first product produced in the SMR to an input of a water gas shift (WGS) reaction channel defined within a reaction tube of a WGS reactor; and flowing a second gas including the first product through the WGS reaction channel to produce a second product. Flowing the second gas includes flowing the second gas across a heat transfer material disposed in the WGS reaction channel to reduce the temperature of the flowing second gas; and flowing the second gas across a WGS catalyst disposed in the reaction channel.

Embodiments can include one or any combination of two or more of the following features.

Flowing the first gas along the bayonet flow path of the SMR includes flowing the first gas from an annular space into an SMR flow channel, wherein the annular space is defined between an outer tube and an inner tube disposed within the outer tube and the SMR flow channel is defined within the inner tube. Flowing the first gas along the bayonet flow path of the SMR includes flowing the first gas from an inlet at a second end of the outer tube, along the annular space toward a first end of the outer tube, along the SMR flow channel defined within the inner tube, and to an outlet at a second end of the inner tube. The method includes heating the first gas flowing along the annular space with heat from the gas flowing along the flow channel defined within the inner tube.

Flowing the first gas through a foam disposed along the bayonet flow path includes flowing the gas through a catalytic foam.

The method includes flowing a cooling fluid through a cooling fluid flow pathway defined between a housing of the WGS reactor and the reaction tube of the WGS reactor. Contacting the flowing second gas to the heat transfer material disposed in the WGS reaction channel includes transferring heat from the flowing second gas to the cooling fluid. The method includes heating the cooling fluid to a temperature of between 100° C. and 300° C. The method includes providing heated cooling fluid from the cooling fluid flow pathway to an input of the bayonet flow path of the SMR. The method includes providing heated cooling fluid from the cooling fluid flow pathway to an input of the WGS reaction channel. The method includes adjusting a flow rate of the cooling fluid through the cooling fluid flow pathway based on a rate at which the first product is provided to the input of the WGS reaction channel.

The method includes providing the first product to the input of the WGS reaction channel at a temperature equal to or greater than a temperature at which the WGS catalyst structure catalyzes a hydrogen generation reaction. The method includes providing the first product to the input of the WGS reaction channel at a temperature of between 200° C. and 450° C.

Flowing the second gas across the WGS catalyst includes: flowing the second gas across a first WGS catalyst disposed in the WGS reaction channel, wherein the first WGS catalyst is configured to catalyze a hydrogen generation reaction in a first temperature range; and flowing the second gas across a second WGS catalyst disposed in the reaction channel, wherein the second WGS catalyst is configured to catalyze the hydrogen generation reaction in a second temperature range lower than the first temperature range. The method includes flowing the second gas across the heat transfer material after flowing the second gas across the first WGS catalyst.

Flowing the second gas to the heat transfer material includes reducing the temperature of the flowing second gas to a temperature at which the WGS catalyst is capable of catalyzing a hydrogen generation reaction.

The method includes flowing the first gas along the bayonet flow path of the SMR to produce carbon monoxide and hydrogen. Providing the first product to the input of the WGS reaction channel includes providing carbon monoxide to the input of the WGS reaction channel.

The method includes flowing the second gas along the WGS reaction channel to produce carbon dioxide and hydrogen.

In a general aspect, combinable with any of the previous aspects, a steam methane reformer (SMR) system includes an outer tube, wherein a first end of the outer tube is closed; an inner tube disposed in the outer tube, wherein a first end of the inner tube is open. A flow channel is defined within the inner tube and an annular space is defined between the outer tube and the inner tube, the flow channel being in fluid communication with the annular space. The SMR system includes a catalytic foam disposed in the annular space between the outer tube and the inner tube, the catalytic foam including a catalyst.

Embodiments can include one or any combination of two or more of the following features.

The catalytic foam includes a foam substrate, wherein the catalyst is disposed on the foam substrate.

The SMR system includes an outer heat exchange foam disposed in the annular space between the outer tube and the inner tube. A distance between the outer heat exchange foam and a second end of the outer tube is less than a distance between the catalytic foam and the second end of the outer tube. The e outer heat exchange foam has an annular shape.

The catalytic foam has an annular shape.

The SMR system includes an inner heat exchange foam disposed in the flow channel.

The catalytic foam contacts the inner tube.

A thickness of the catalytic foam is equal to a width of the annular space.

The catalytic foam has a porosity of between 10 pores per inch (ppi) and 30 ppi.

A length of the catalytic foam along the inner tube is between 10 inches and 5 feet.

A length of the catalytic foam in an externally heated section of the outer tube is between 10% and 30% of a length of the outer tube.

The catalytic foam includes a metal foam. The catalytic foam includes nickel.

The catalytic foam includes silicon carbide.

A bayonet flow path through the SMR system is defined from an inlet at a second end of the outer tube, along the annular space between the outer tube and the inner tube toward the first end of the outer tube, along the flow channel, and to an outlet at a second end of the inner tube.

A ratio between a cross-sectional area of the flow channel and a cross-sectional area of the annular space is between 1 and 5.

The inner tube is coaxial with the outer tube.

A width of the annular space between the outer tube and the inner tube is between 0.2 inches and 4 inches.

A length of the outer tube is between 8 feet and 30 feet.

The SMR system includes an elongated baffle disposed in the flow channel.

The SMR system includes a heat transfer material disposed on an outer surface of the first end of the outer tube. The heat transfer material includes a fin disposed on the outer surface of the first end of the outer tube. The heat transfer material includes a baffle disposed on the outer surface of the first end of the outer tube. The heat transfer material includes a foam disposed on the outer surface of the first end of the outer tube.

In a general aspect, combinable with any of the previous aspects, a method for producing hydrogen in a steam methane reformer (SMR) system includes flowing a gas along a bayonet flow path of the SMR system. The bayonet flow path is defined by an annular space defined between an outer tube and an inner tube disposed in the outer tube, wherein a first end of the outer tube is closed and a first end of the inner tube is open; a flow channel defined within the inner tube, wherein the flow channel is in fluid communication with the annular space. Flowing the gas along the bayonet flow path includes flowing the gas through a catalytic foam disposed in the annular space between the outer tube and the inner tube.

Embodiments can include one or any combination of two or more of the following features.

Flowing the gas along the bayonet flow path includes flowing the gas through an outer heat exchange foam disposed in the annular space between the outer tube and the inner tube.

The method includes flowing the gas through the outer heat exchange foam before flowing the gas through the catalytic foam.

Flowing the gas along the bayonet flow path includes flowing the gas through an inner heat exchange foam disposed in the flow channel.

Flowing the gas along the bayonet flow path includes flowing the gas from the annular space into the flow channel. The method includes flowing the gas from the annular space at the first end of the outer tube into the flow channel at the first end of the inner tube.

The method includes heating the gas flowing in the annular space with heat from the gas flowing in the flow channel defined within the inner tube.

The method includes heating the gas in the annular space at the first end of the outer tube.

The method includes flowing the gas along at least a portion of the bayonet flow path in turbulent flow.

The method includes producing hydrogen from the gas flowing along the bayonet flow path.

In an aspect, combinable with any of the previous aspects, a water gas shift (WGS) reactor system includes a housing; a reaction tube disposed in the housing, wherein a reaction channel is defined within the reaction tube and a cooling fluid channel is defined between the housing and the reaction tube; a catalyst disposed in the reaction channel, the catalyst configured to catalyze a hydrogen generation reaction; and a heat transfer material disposed in the reaction channel.

Embodiments can include one or any combination of two or more of the following features.

The catalyst includes a first catalyst disposed in the reaction channel and configured to catalyze the hydrogen generation reaction in a first temperature range; and a second catalyst disposed in the reaction channel and configured to catalyze the hydrogen generation reaction in a second temperature range lower than the first temperature range. The heat transfer material is disposed in the reaction channel between the first catalyst and the second catalyst. The first catalyst is configured to catalyze the hydrogen generation reaction at a temperature of between 200° C. and 450° C. The second catalyst is configured to catalyze the hydrogen generation reaction at a temperature of between 180° C. and 350° C.

A distance between the heat transfer material and an inlet of the reaction channel is less than a distance between the catalyst structure and the inlet of the reaction channel. The catalyst includes a catalyst configured to catalyze the hydrogen generation reaction at a temperature of between 200° C. and 450° C.

The catalyst includes a foam including a catalyst material. The catalytic foam includes a foam substrate, wherein the catalyst material is disposed on the foam substrate. The foam has a porosity of between 5 pores per inch (ppi) and 30 ppi.

The catalyst includes catalyst pellets.

The heat transfer material includes a foam. The foam has a porosity of between 5 ppi and 30 ppi.

The heat transfer material includes a fin.

The WGS reactor system includes a cooling channel heat transfer material disposed in the cooling fluid channel. The cooling channel heat transfer material includes a foam.

The housing includes a cylindrical housing, and wherein the reaction tube is coaxial with the cylindrical housing.

The WGS reactor system includes an inner tube disposed in the reaction tube, wherein the reaction channel is defined by an annular space between the reaction tube and the inner tube, and wherein an inner cooling fluid channel is defined within the inner tube.

The WGS reactor system includes multiple reaction tubes disposed in the housing.

An inlet of the reaction channel and an outlet of the cooling fluid channel are disposed at a first end of the WGS reactor.

An inlet of the reaction channel is in fluid communication with an outlet of the cooling fluid channel.

An outlet of the cooling fluid channel is configured to be in fluid communication with an inlet of a steam methane reformer (SMR).

The WGS reactor system includes a flow controller configured to control a flow rate of cooling fluid through the cooling fluid channel.

In a general aspect, a method for producing hydrogen in a water gas shift (WGS) reactor includes flowing a cooling fluid through a cooling fluid channel defined between a housing of a WGS reactor and a reaction tube disposed in the housing; and flowing a gas including carbon monoxide and steam through a reaction channel defined within the reaction tube. Flowing the gas through the reaction channel includes flowing the gas across a heat transfer material disposed in the reaction channel to transfer heat from the flowing gas to the cooling fluid in the cooling fluid channel; and flowing the gas across a catalyst disposed in the reaction channel, the catalyst configured to catalyze a hydrogen generation reaction.

Embodiments can include one or any combination of two or more of the following features.

Flowing the gas across the heat transfer material includes reducing the temperature of the flowing gas to a temperature at which the catalyst structure catalyzes the hydrogen generation reaction. The method includes reducing the temperature of the flowing gas to between 200° C. and 450° C.

Flowing the gas across the catalyst includes flowing the gas across a first catalyst disposed in the reaction channel, wherein the first catalyst is configured to catalyze the hydrogen generation reaction in a first temperature range; and flowing the gas across a second catalyst disposed in the reaction channel, wherein the second catalyst is configured to catalyze the hydrogen generation reaction in a second temperature range lower than the first temperature range. The method includes receiving the gas into the reaction channel at a temperature within the first temperature range. The method includes receiving the gas into the reaction channel at a temperature of between 200° C. and 450° C. The method includes flowing the gas across the heat transfer material after flowing the gas across the first catalyst. Flowing the gas across the heat transfer material includes reducing the temperature of the flowing gas to within the second temperature range. The method includes reducing the temperature of the flowing gas to between 180° C. and 350° C.

The method includes flowing cooling fluid through an inner cooling fluid channel defined within an inner tube disposed in the reaction tube.

Flowing the gas through the reaction channel includes flowing the gas from a first end of the WGS reactor to a second end of the WGS reactor; and wherein flowing the cooling fluid through the cooling fluid channel includes flowing the cooling fluid from the second end of the WGS reactor to the first end of the WGS reactor.

The method includes adjusting a flow rate of the cooling fluid through the cooling fluid channel based on a flow rate of the gas through the reaction channel.

The method includes outputting the cooling fluid from the cooling fluid channel at a temperature of between 100° C. and 300° C.

The method includes providing steam from the cooling fluid channel to an input of the reaction channel.

The method includes providing steam from the cooling fluid channel to an input of a steam methane reformer.

The approaches described here can have one or more of the following advantages. The use of recuperated heat to heat and cool fluid streams to target temperatures enables the hydrogen generation process to be an energy efficient, low-emission process. The systems can be modular, e.g., enabling a target throughput to be achieved by change in system configuration or operation. The systems can be scalable for large-scale, energy efficient hydrogen generation.

The details of one or more implementations are set forth in the accompanying drawings and the description below. Other features and advantages will be apparent from the description and drawings, and from the claims.

DETAILED DESCRIPTION

We describe here systems for energy-efficient, low-emission production of hydrogen gas (H2) from hydrocarbons. The systems include a steam methane reactor (SMR) having a bayonet flow path in which incoming reactant fluid flowing along the flow path is heated by transfer of recovered heat from outgoing fluid flowing along the flow path. Catalytic foam and heat transfer foam disposed along the bayonet flow path catalyze a hydrogen generation reaction in the SMR and facilitate heat transfer to the incoming reactant fluid. Product fluid from the SMR is provided to a water gas shift (WGS) reactor. The fluid flows across one or more WGS catalysts and one or more heat transfer materials disposed along a reaction channel in the WGS reactor. The WGS catalysts and heat transfer material catalyze a hydrogen generation reaction in the WGS and facilitate removal of heat generated by the exothermic WGS hydrogen generation reaction. Cooling fluid heated by heat from the WGS hydrogen generation reaction can be provided as input into the SMR. The use of heat transfer among fluid streams in the SMR enables energy efficient production of hydrogen to be achieved.

The hydrogen generation systems described here are modular and have a small footprint. The systems can be upgraded or turned down without significant downtime. Elements of the systems, such as tubes, manifolds, flanges, and catalysts, can be taken apart or replaced easily, enabling maintenance or operational adjustments with low downtime.

Figure 1:
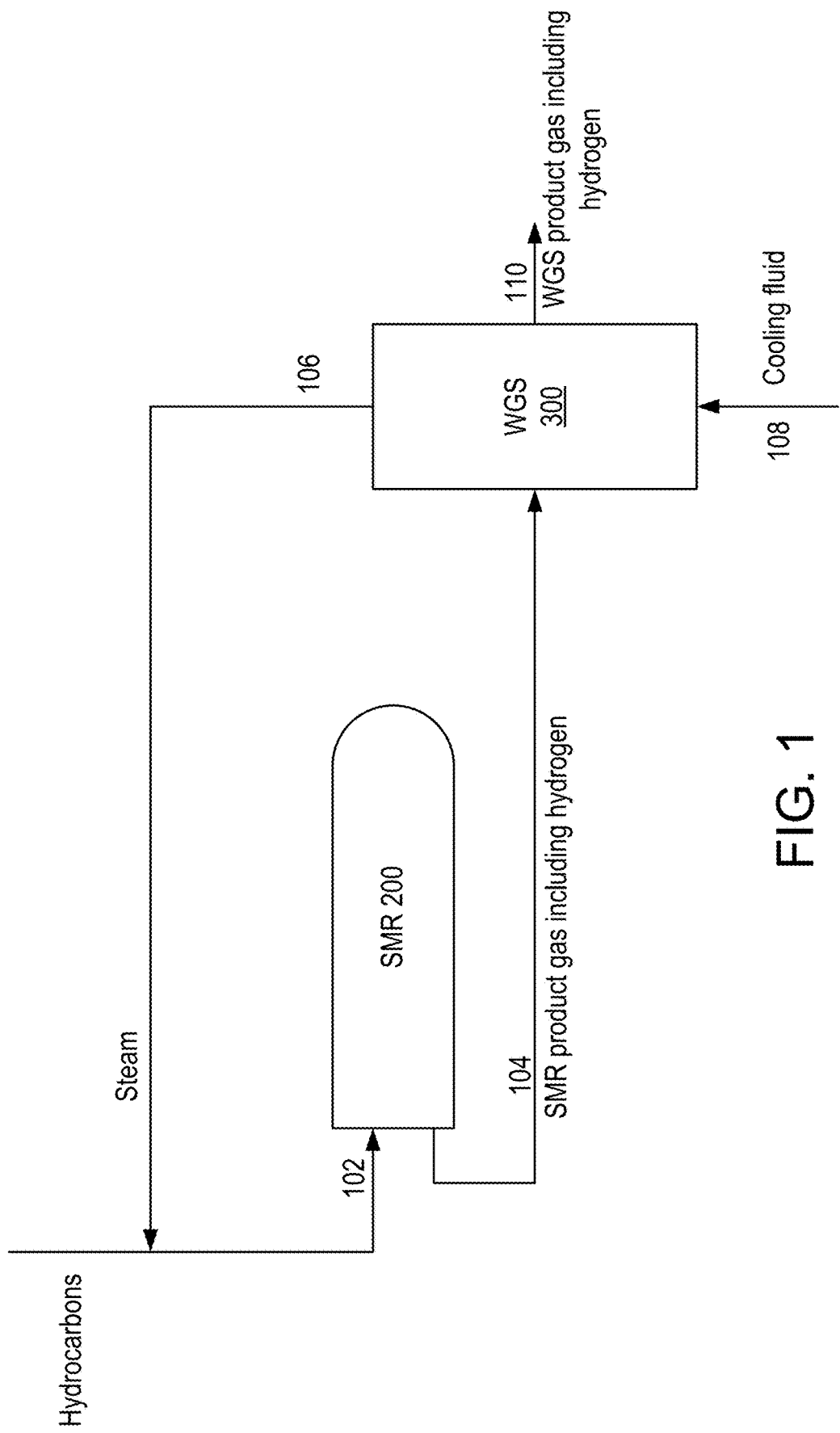
FIG. 1 is a diagram of a hydrogen generation system.

Referring to FIG. 1, a schematic diagram of a hydrogen generation system 100, shown in an operational configuration, includes a steam methane reactor (SMR) 200 and a water gas shift (WGS) reactor 300 that together generate hydrogen gas (H2) from hydrocarbons, such as natural gas, biogas, methane, methanol, or other suitable hydrocarbons. Fluid 102, including hydrocarbons and water vapor (steam) is input into the SMR and reacted in the presence of a catalytic foam. Recuperated heat from fluid flowing through the SMR 200 and externally applied heat raise the temperature of the reactants flowing through the SMR 200 to a temperature at which the SMR hydrogen generation reaction occurs. Heating of the reactants using residual heat from fluid flowing through the SMR reduces the heating load on an external heat source, thereby enabling energy efficient operation. Product gas 104 generated in the SMR includes hydrogen gas and carbon monoxide.

At least a portion of the product gas 104 (e.g., hydrogen and carbon monoxide), along with steam, is provided as fluid input into the WGS reactor 300. For energy efficient operation, the product gas 104 is output from the SMR at a temperature appropriate for input into the WGS reactor 300, thereby enabling active heating or cooling of the fluid input into the WGS reactor 300 to be avoided. The fluid input into the WGS reactor 300 flows along a reaction channel of the WGS reactor 300 and reacts in the presence of a WGS catalyst, such as a catalytic foam, to produce hydrogen and carbon dioxide. A heat exchange material, such as a foam, is disposed in the reaction channel and transfers excess heat generated by the exothermic WGS hydrogen generation reaction to a cooling fluid 108 flowing through the WGS reactor 300. Cooling of the fluid in the reaction channel by heat transfer facilitated by the heat exchange material allows active cooling in the WGS reactor 300 to be avoided, enabling energy efficient operation. Product gas 110 generated in the WGS includes hydrogen gas and carbon dioxide. Heated cooling fluid 106, in the form of steam, can be provided as part of the fluid 102 input into the SMR 200. In some examples, additional steam is provided from an external water source, e.g., for system startup.

Figure 2A:
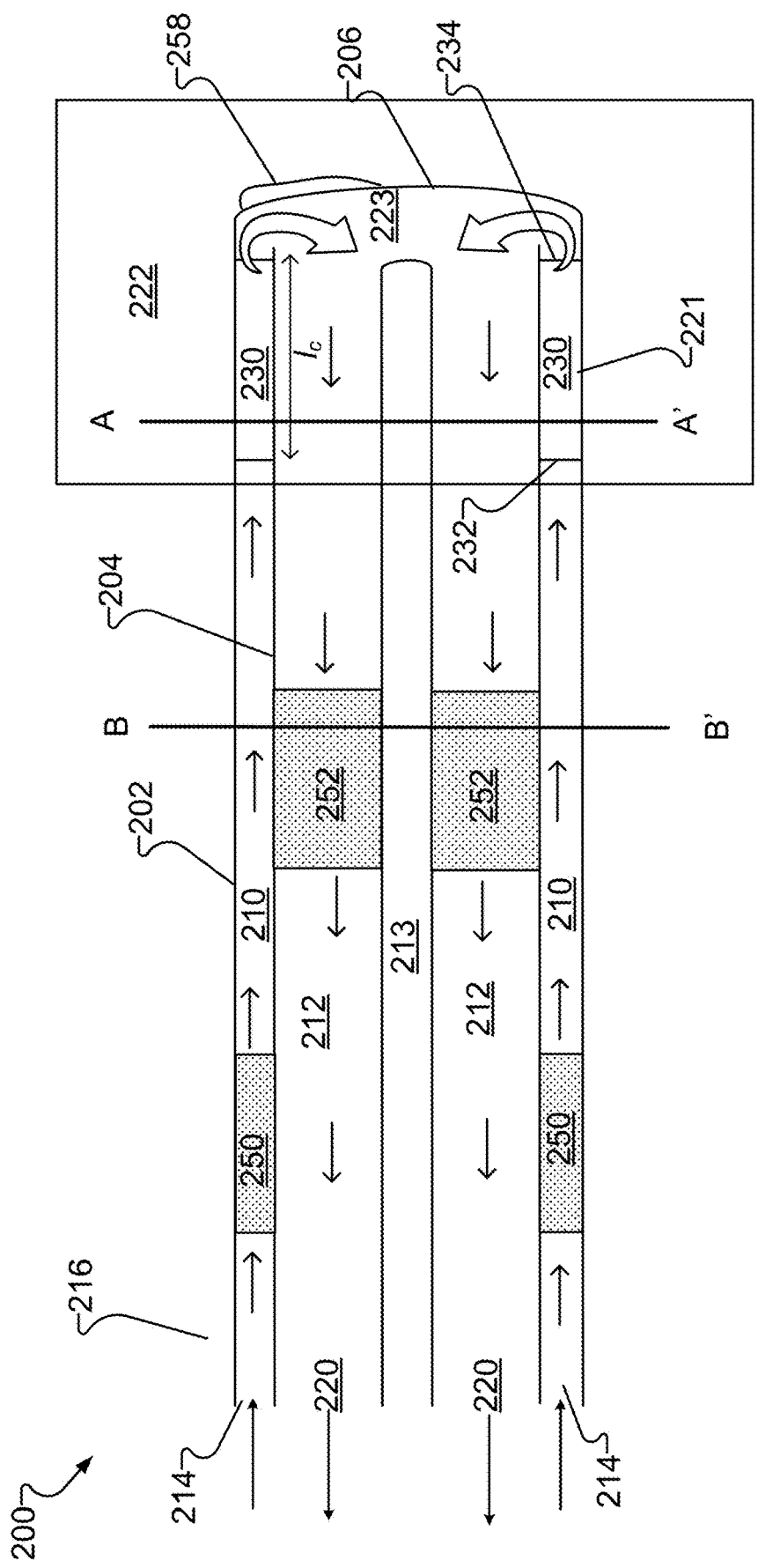
FIG. 2A is a cross sectional view of a steam methane reformer (SMR).
Figure 2C:
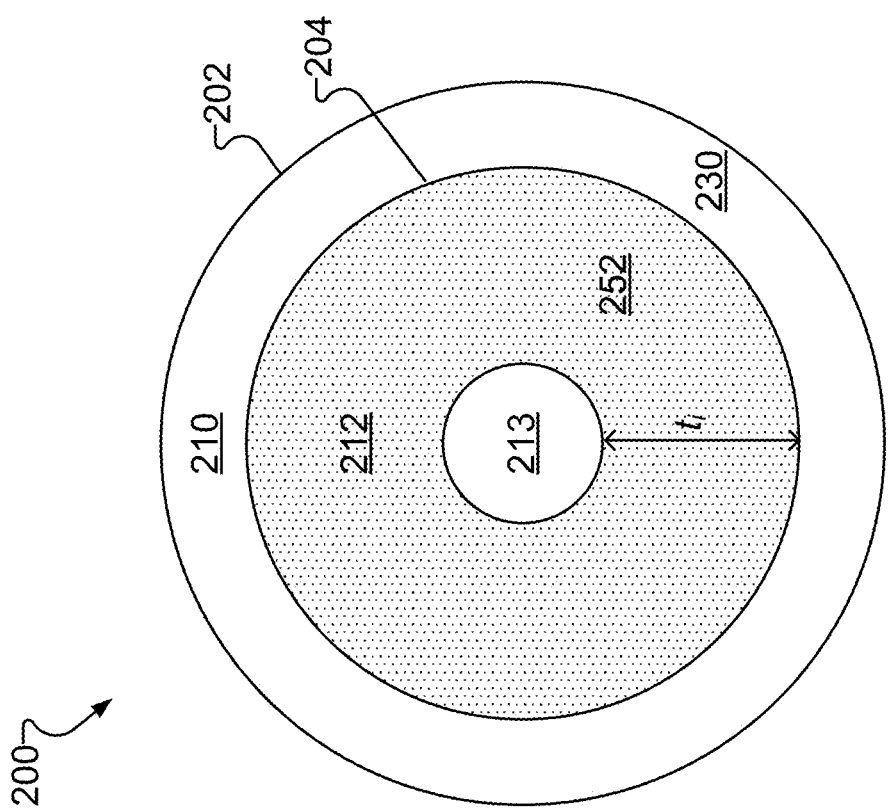
FIG. 2C is a cross-sectional view of the SMR of FIG. 2A along the line B-B'.
Figure 2B:
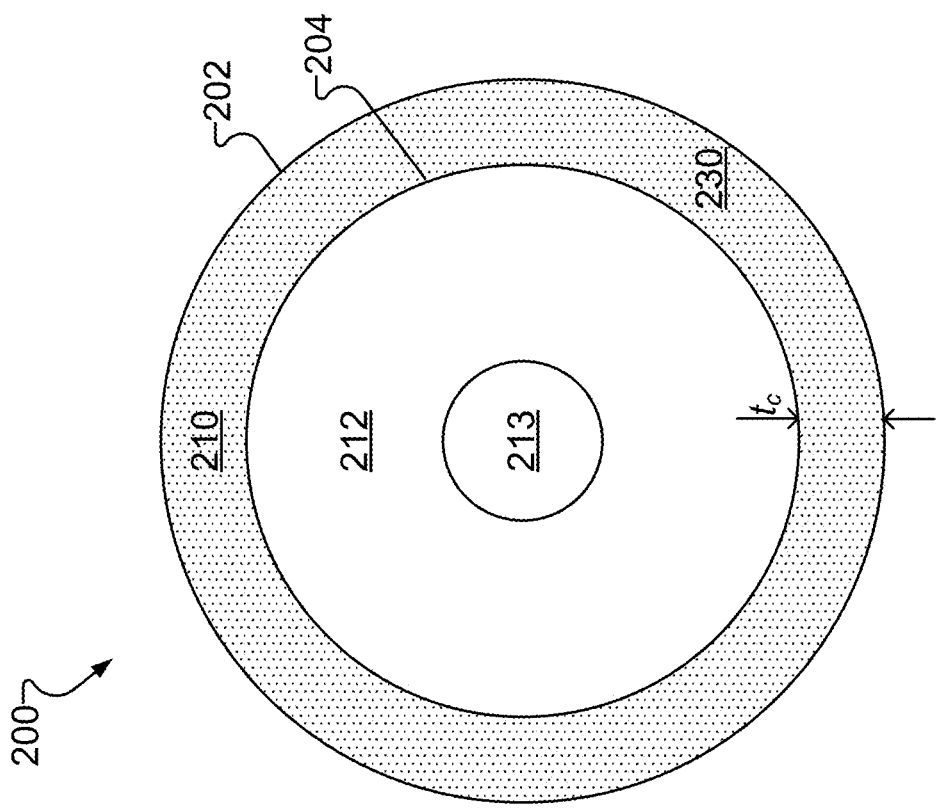
FIG. 2B is a cross-sectional view of the SMR of FIG. 2A along the line A-A'.

Referring to FIGS. 2A-2C, the SMR 200 includes two concentric tubes, an outer tube 202 and an inner tube 204 disposed coaxially in the outer tube 202. A first end of the outer tube 202 at a first end 206 of the SMR 200 is closed and a first end of the inner tube 204 is open. An annular space 210 is defined between the outer tube 202 and the inner tube 204. A flow channel 212 is defined within the inner tube 204 and is in fluid communication with the annular space 210. An elongated baffle 213 is disposed along at least a portion of the length of the inner tube 204.

Fluid (e.g., gas) flowing through the SMR 200 follows a bayonet flow path (indicated by arrows in FIG. 2A) through the SMR 200 from an inlet 214 into the annular space 210 at a second end 216 of the SMR 200, along the annular space 210 toward the first end of the outer tube 202 at the first end 206 of the SMR, into the flow channel 212, along the flow channel 212 toward a second end of the inner tube 204 at the second end 216 of the SMR, and to an outlet 220 at the second end of the inner tube 204. Reactants (e.g., hydrocarbons and water) are input into the bayonet flow path at the inlet 214. A hydrogen generation reaction occurs toward the first end 206 of the outer tube in the presence of an SMR catalyst, generating products (e.g., hydrogen gas and carbon monoxide) that are output from the SMR 200 via the outlet 220. An example hydrogen generation reaction that occurs in the SMR 200 is represented as follows:

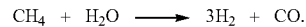

$$CH_4 + H_2O \longrightarrow 3H_2 + CO.$$

The hydrogen generation reaction is an endothermic reaction that occurs above a reaction temperature, such as between 600° C. and 1000° C. An external heat source 222 heats the fluid flowing along the annular space 210 at the first end 206 of the SMR 200 to at least the reaction temperature. The external heat source 222 can be driven by combustion (e.g., a gas-powered furnace), solar energy, or another appropriate energy source.

Fluid in the annular space 210 at the first end 206 of the SMR 200 is heated by the external heat source 222. The heated fluid flows from the annular space 210 at the first end 206 of the SMR 200 into the flow channel 212, entering the flow channel at high temperature. The bayonet flow path of the SMR, in which the outer and inner tubes 202, 204 (and hence the annular space 210 and flow channel 212) are concentric, provides a configuration in which heat from the high-temperature fluid flowing along the flow channel 212 can be transferred back to the lower-temperature fluid flowing along the annular space 210. The inner tube 204 is designed to facilitate this heat transfer, e.g., the inner tube 204 can be formed of a material with high thermal conductivity, such as a metal or silicon carbide, and can have thin walls. The use of recuperated heat to raise the temperature of the fluid flowing along the annular space 210 lessens the load on the external heat source 222, improving the energy efficiency of the hydrogen generation reaction. In addition, when the external heat source 222 is a combustion furnace, a reduced load on the furnace reduces hydrocarbon consumption of the external heat source 222, thereby reducing emissions associated with the hydrogen generation reaction.

Referring specifically to FIGS. 2A and 2B, a catalytic foam 230 is disposed in the annular space 210 between the outer tube 202 and the inner tube 204. The catalytic foam 230 includes an SMR catalyst that catalyzes the hydrogen generation reaction (e.g., the generation of hydrogen and carbon monoxide from hydrocarbons and water). The hydrogen generation reaction occurs primarily in the portions of the bayonet flow path in which the catalytic foam 230 is disposed, and that are at a temperature at or above the reaction temperature. For instance, the hydrogen generation reaction occurs in portions of the bayonet flow path that are heated by the external heat source 222, such as in a heated portion 221 of the annular space 210 toward the first end 206 of the SMR 200 and in an end space 223 at the first end 206 of the SMR 200. The hydrogen generation reaction can also occur in regions outside the heated portion 221, e.g., regions that are heated to or above the reaction temperature by heat transfer from fluid flowing along the flow channel 212 (discussed further below).

In some examples, the SMR catalyst is coated onto a foam substrate to form the catalytic foam 230. In some examples, the SMR catalyst is integrated or impregnated into a foam substrate to form the catalytic foam 230. The catalytic foam 230 is a porous structure through which one or more fluid flow paths are defined from an upstream side 232 to a downstream side 234 of the catalytic foam 230. As fluid flows along the bayonet flow path through the SMR 200, the fluid flows through the fluid flow paths of the catalytic foam 230 and the catalyst in the catalytic foam 230 catalyzes the hydrogen generation reaction in the flowing fluid. The porosity of the catalytic foam 230 provides a high surface area for contact between the catalytic foam 230 and the flowing fluid, which facilitates efficient catalysis of the hydrogen generation reaction.

The catalytic foam 230 includes a thermally conductive material such that the catalytic foam 230 also facilitates heat transfer to the fluid flowing through the catalytic foam 230 from the external heat source 222, the fluid flowing along the flow channel 212 in the inner tube 202, or both. Physical contact between the catalytic foam 230 and the outer tube 202 enables transfer of heat from the external heat source 222 to the fluid flowing through the catalytic foam. Physical contact between the catalytic foam 230 and the inner tube 204 enables transfer of heat from the fluid flowing along the flow channel 212 to the fluid flowing through the catalytic foam. The high surface area of the catalytic foam 230 facilitates heat transfer. The porosity of the catalytic foam 230 also can lead to turbulent fluid flow in at least a portion of the annular space 210, further facilitating heat transfer to the fluid flowing along the annular space 210 and enhancing the energy efficiency of the hydrogen generation process.

The catalytic foam 230 has an annular shape. As shown in FIGS. 2A and 2B, a thickness $t_c$ of the annulus of the catalytic foam 230 (referred to simply as the thickness of the catalytic foam 230) is equal to the radial distance between the outer wall of the inner tube 204 and the inner wall of the outer tube 202 (referred to as the width of the annular space 210) such that the catalytic foam 230 is in physical contact with both the outer tube 202 and the inner tube 204. Contact between the catalytic foam 230 and the outer and inner tubes 202, 204 enables heat transfer from the external heat source 222 and the fluid flowing along the flow channel 212 in the inner tube 202 to the fluid flowing through the catalytic foam 230. In some examples, the thickness $t_c$ of the catalytic foam 230 is less than the width of the annular space 210 and the catalytic foam 230 is in physical contact with only one of the tubes, such as with only the outer tube 204 or only the inner tube 204.

The porosity of the catalytic foam 230 (e.g., pores per inch) and length of the catalytic foam 230 (referring to the length of the catalytic foam along the axis of the outer tube 202 from the upstream side 232 to the downstream side 234 of the catalytic foam 230) affect the surface area of the catalytic foam 230, thus affecting the efficiency of catalysis and heat transfer. Increased porosity and length both increase the opportunity for contact between the flowing fluid and the catalytic foam 230, thereby enhancing the efficiency of both catalysis and heat transfer. The length of the catalytic foam 230 also affect the drop in fluid pressure that occurs across the catalytic foam 230 as fluid flows through the catalytic foam 230. Increased porosity and length both cause increased pressure drop across the catalytic foam 230, which can slow fluid flow along the bayonet flow path, reducing throughput of the SMR 200. The porosity and length of the catalytic foam 230 can be selected to achieve efficient catalysis and heat transfer with low pressure drop across the catalytic foam 230. For instance, the catalytic foam 230 can have a porosity of between 10 pores per inch (ppi) and 30 ppi. In some examples, the catalytic foam 230 is entirely within the heated portion 221 of the outer tube 202 (as in the example of FIG. 2A), e.g., the length $l_c$ of the catalytic foam 230 is between 10% and 30% of the length of the heated portion 221 of the outer tube 202, such as between 10 inches and 5 feet in length. In some examples, the catalytic foam 230 extends beyond the heated portion 221 of the outer tube 202 and can extend up to the entire length of the outer tube. In some examples, the porosity and length of the catalytic foam 230 can be selected such that a fluid pressure drop of less than 1 pound per square inch (psi) occurs across the catalytic foam 230.

The catalytic foam 230 includes a material (e.g., the foam substrate) having a thermal conductivity sufficient to facilitate heat transfer to fluid flowing through the catalytic foam 230, e.g., heat transfer from the fluid flowing along the flow channel 212, heat transfer from the external heat source 222, or both. The material of the catalytic foam 230 is non-reactive to the fluid (e.g., the reactants and products of the hydrogen generation reaction) flowing along the bayonet flow path of the SMR 200 in the temperature range at which the SMR 200 is operated. The material of the catalytic foam 230 can be thermally compatible with, e.g., have a similar thermal expansion coefficient as, the material of the outer tube 202, the inner tube 204, or both, e.g., to avoid delamination of the catalytic foam 230 from the tubes 202, 204. For instance, the foam can be a metal foam, such as a nickel or stainless steel foam, or a silicon carbide foam; or another suitable material.

Referring to FIG. 2A, an outer heat exchange foam 250 formed of a thermally conductive material is disposed in the annular space 210 between the outer tube 202 and the inner tube 204. A distance between the outer heat exchange foam 250 and the inlet 214 at the second end 216 of the outer tube 202 is less than a distance between the catalytic foam 230 and the inlet 214, such that fluid flowing along the annular space 210 flows through the outer heat exchange foam 250 prior to flowing through the catalytic foam 230. The outer heat exchange foam 250 is in physical contact with the inner tube 204 and facilitates heat transfer from the fluid flowing along the flow channel 212 to the fluid flowing through the outer heat exchange foam 250.

Referring also to FIG. 2C, an inner heat exchange foam 252 formed of a thermally conductive material is disposed in the flow channel 212 defined within the inner tube 204. The inner heat exchange foam 252 is in physical contact with the inner tube 204 and facilitates heat transfer from fluid flowing through the inner heat exchange foam 252 to the fluid flowing along the annular space 210. The porosity of the outer and inner heat exchange foams 250, 252 provide a high surface area for contact between the foams 250, 252 and the fluid flowing through the respective foam, which facilitates efficient heat transfer. The porosity of the outer and inner heat exchange foams 250, 252 also can lead to turbulent fluid flow in at least a portion of the annular space 210 or the flow channel 212, respectively, further facilitating heat transfer. In some examples, a catalytic foam can be disposed in the flow channel 212, e.g., in addition to or instead of the inner heat exchange foam 252.

The heat transfer enabled by the outer and inner heat exchange foams 250, 252 enables the fluid in the annular space 210 to be preheated before the fluid reaches the catalytic foam 230, using excess heat recovered from the higher temperature fluid flowing along the flow channel 212. The use of recuperated heat to preheat the fluid flowing along the annular space 210 can reduce the amount of heat provided by the external heat source 222 to heat the fluid flowing along the annular space 210 to the reaction temperature, thereby enhancing the efficiency of the SMR 200.

The outer heat exchange foam 250 has an annular shape. A thickness of the annulus of the outer heat exchange foam 250 (referred to as the thickness of the outer heat exchange foam 250) is equal to the width of the annular space 210 such that the outer heat exchange foam 250 is in physical contact with both the outer tube 202 and the inner tube 204. In some examples, the thickness of the outer heat exchange foam 250 is less than the width of the annular space 210 and the outer heat exchange foam 250 is in physical contact with only one of the tubes, such as with only the inner tube 204.

The inner heat exchange foam 252 also has an annular shape. A thickness $t_i$ of the annulus of the inner heat exchange foam 252 is equal to the radial distance between the inner tube 204 and the elongated baffle 213 such that the inner heat exchange foam 252 is in physical contact with the inner tube 204. In some examples, the thickness $t_i$ of the inner heat exchange foam 252 is less than the radial distance and the inner heat exchange foam 252 is in physical contact with the inner tube 204 but not with the elongated baffle 213. In some examples, the elongated baffle 213 is not present, and the inner heat exchange foam 252 is annular or cylindrical, with a thickness that is equal to or less than the radius of the flow channel 212.

The porosity and length of each of the outer heat exchange foam 250 and the inner heat exchange foam 252 can be selected to achieve efficient heat transfer with low pressure drop across the respective heat exchange foam 250, 252. For instance, each of the heat exchange foams 250, 252 can have a porosity of between 10 pores per inch (ppi) and 30 ppi. The length of the outer heat exchange foam 250 can be as small as, e.g., 4 inches, and as long as the distance between the inlet 212 and the upstream side 232 of the catalytic foam 230. The length of the inner heat exchange foam 252 can be as small as, e.g., 4 inches, and as long as the distance between the first end 208 of the inner tube 204 and the outlet 220 at the second end 218 of the inner tube 204. In some examples, the porosity and length of the outer and inner heat exchange foams 250, 252 can be selected such that a pressure drop of less than 1 pound per square inch (psi) occurs across the each of the outer and inner heat exchange foams 250, 252. In some examples, the outer heat exchange foam 250, the inner heat exchange foam 252, or both are not present.

The outer and inner heat exchange foams 250, 252 are formed of a material having a thermal conductivity sufficient to facilitate heat transfer to the fluid flowing along the annular space 210. The material of the heat exchange foams 250, 252 is non-reactive to the fluid (e.g., the reactants and products of the hydrogen generation reaction) flowing along the bayonet flow path of the SMR 200 in the temperature range at which the SMR 200 is to be operated. The material of the outer and inner heat exchange foams 250, 252 can be thermally compatible with, e.g., have a similar thermal expansion coefficient as the inner tube 204, e.g., to avoid delamination. For instance, the heat exchange foams 250, 252 can be metal foams, such as nickel or stainless steel foams; or silicon carbide foams; or another suitable material.

The presence of the catalytic foam 230 and the outer and inner heat exchange foams 250, 252 along the bayonet flow path enables both high throughput through the SMR 200 and energy efficient operation of the SMR 200. For instance, heating the fluid flowing along the annular space 210 with recuperated heat from the higher temperature fluid flowing along the flow channel 212 enables the reaction temperature to be reached with less input of heat from the external heat source 222, providing for energy efficient SMR operation. In addition, by heating the fluid flowing along the annular space 210 with recuperated heat, the annular space 210 can be made relatively wide, such as between 0.2 inches and 4 inches, which can accommodate relatively high volume gas flow.

Referring to FIG. 2A, a heat transfer material 258 is disposed on an outer surface of the first end 206 of the outer tube 202 to facilitate heat transfer from the external heat source 222 to the fluid flowing along the bayonet flow path of the SMR 200. In the example of FIG. 2A, the heat transfer material 258 is a fin; in some examples, the heat transfer material 258 can be a baffle, a foam, or another structure suitable for facilitating heat transfer. The heat transfer material 258 enhances the efficiency of heat transfer from the external heat source 222 to the fluid flowing along the annular space 210, contributing to the energy efficient operation of the SMR by increasing the amount of heat produced by the external heat source 222 that is used to heat the fluid in the bayonet flow path.

The locations, lengths, and properties (e.g., porosity, thermal conductivity) of the catalytic foam 230 and the inner and outer heat exchange foams 250, 252 can be selected to achieve a desired temperature at one or more points along the bayonet flow path. For instance, the foam locations, lengths, and properties can be selected to achieve a target temperature at the catalytic foam 230 to facilitate a high efficiency hydrogen generation reaction. In some examples, fluid output from the SMR is provided to a WGS reactor to act as a reactant in a further hydrogen generation reaction, and the foam locations and lengths can be selected to achieve a target temperature of fluid output from the outlet 220 of the flow channel 212, such as a target temperature for input into the WGS reactor. By outputting fluid from the SMR 200 at the target temperature for input into the WGS reactor, the use of external heat sources for preheating WGS reactor inputs can be reduced or eliminated, enhancing the overall efficiency of the system.

The catalytic foam 230 and outer and inner heat transfer foams 250, 252 can be removed from the SMR 200 and replaced, e.g., with foams of different characteristics (e.g., different porosity, length, thermal conductivity, or other characteristics). For instance, exchanging one or more of the foams can help a desired performance to be achieved, such as a target throughput or a target temperature of the output fluid from the SMR 200.

In some examples, the length of the outer tube 202 is between 8 feet and 30 feet, e.g., for a modular hydrogen generation system. In some examples, the outer tube 202 can be longer, e.g., for an industrial plant scale hydrogen generation system. The width of the annular space can be between 0.2 inches and 4 inches. The ratio between a cross-sectional area of the flow channel 212 and a cross-sectional area of the annular space 210 (see FIG. 2B) is greater than one, e.g., between 1 and 5, to accommodate the increase in moles of gas resulting from the hydrogen generation reaction.

In some examples, the catalytic foam 230, outer heat transfer foam 250, inner heat transfer foam 252, or a combination of any two or more of them is a non-uniform structure, e.g., having a non-uniform porosity or a multimaterial composition. For instance, in locations at which fluid pressure drop across a foam is less important, the foam can be configured with smaller pores to enhance heat transfer. The foam can be a multimaterial foam, e.g., a foam having an outer shell of nickel for chemical compatibility with an inner shell of aluminum or copper for heat transfer efficiency. In some examples, the outer heat transfer foam 250, the inner heat transfer foam 252, or both can be replaced by a solid, cylindrical tube.

Heat transfer in the SMR (e.g., heat transfer from fluid flowing along the flow channel to fluid flowing along the annular space 210) is related to the pressure of the flowing fluid. Increased fluid pressure generally results in increased heat transfer. The walls of the inner and outer tubes 202, 204 for an SMR operating at high pressure are thicker than the walls of the inner and outer tubes 202, 204 for an SMR operating at lower pressure. The increased wall thickness can reduce heat transfer. SMR components (e.g., wall thickness for the inner and outer tubes) and operating parameters (e.g., fluid pressure) can be designed to balance such competing factors.

In the example of FIGS. 2A-2C, the SMR 200 includes a single set of tubes that includes the outer tube 202 and the inner tube 204. In some examples, an SMR includes multiple sets of tubes, each set having an outer tube and an inner tube. The multiple sets of tubes can be operated in parallel for increased throughput and can be heated by a single external heat source 222 sized to generate sufficient heat for the multiple sets of tubes.

The products of the hydrogen generation reaction in the SMR 200, including hydrogen gas and carbon monoxide, along with excess steam, are output from the SMR 200 via the outlet 220. The SMR output is provided as input to a water gas shift (WGS) reactor, where carbon monoxide and water (e.g., steam) are reacted in the presence of a WGS catalyst to generate hydrogen gas and carbon dioxide.

The output from the SMR 200 is at a temperature sufficient for input into the WGS reactor. The WGS reactor includes one or more WGS catalysts, each of which operates in a respective temperature range, and the SMR output is at a temperature at or above the temperature range of the WGS catalyst such that external, active heating of the SMR output does not occur prior to input into the WGS reactor. The temperature of the SMR output is controllable by adjustment of parameters that affect heat transfer between the fluid flowing along the flow channel 212 and the fluid flowing along the annular space 210 of the SMR, e.g., characteristics of the outer heat transfer foam 250, the inner heat transfer foam 252, diameters and materials of the outer and inner tubes 202, 204, flow rate of fluid along the bayonet flow path, or other factors.

Figure 3:
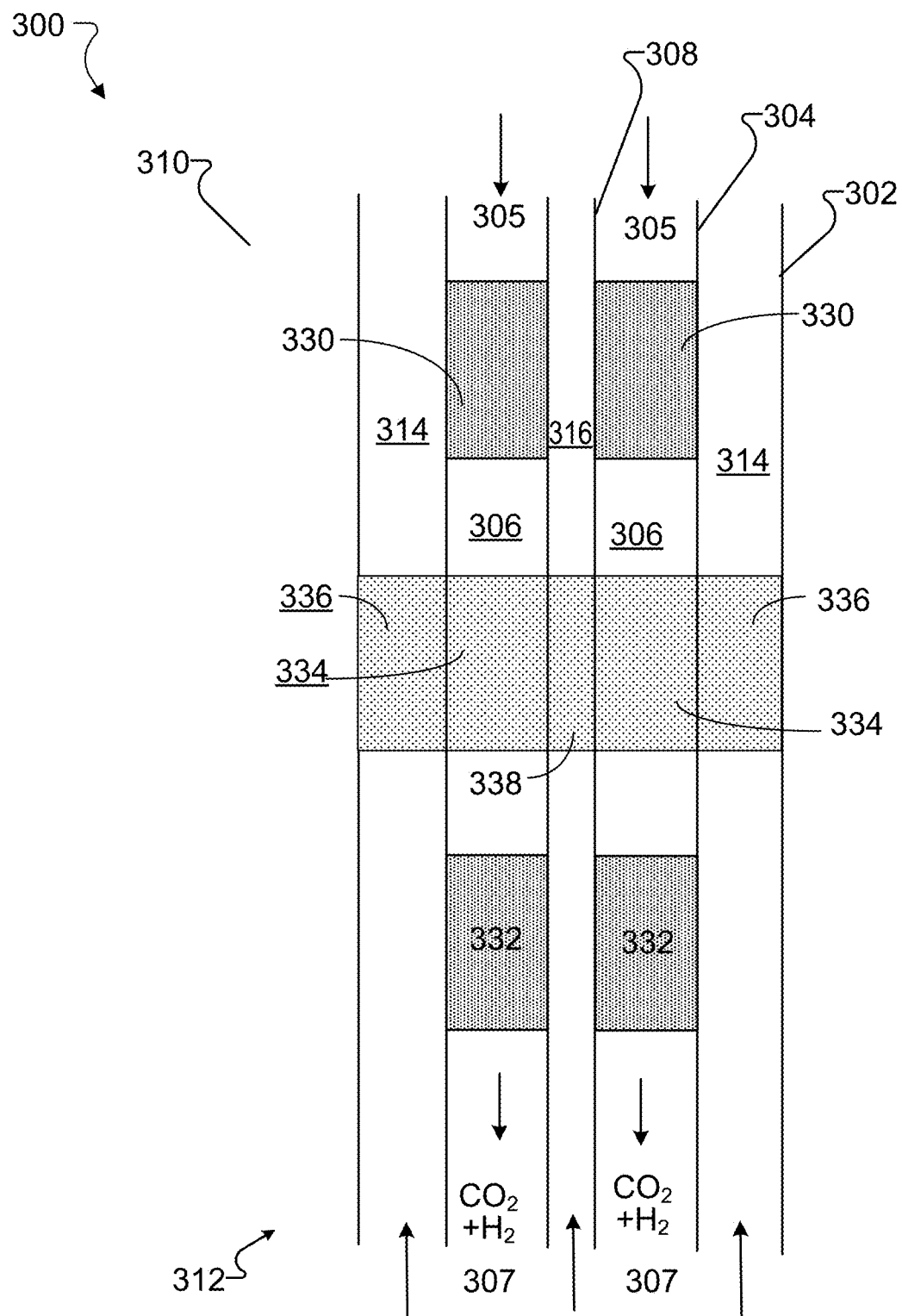
FIG. 3 is a diagram of a water gas shift (WGS) reactor.

Referring to FIG. 3, an example WGS reactor 300 includes a housing 302 and a reaction tube 304 disposed in the housing 302. A reaction channel 306 is defined within the reaction tube 304. For instance, the housing 302 and the reaction tube 304 both can be cylindrical tubes, with the reaction tube 304 coaxial with the cylindrical housing 302. In the example of FIG. 3, the reaction channel 306 is an annular space defined between the reaction tube 304 and an inner tube 308 disposed in the reaction tube 304. In some examples, the reaction channel 306 is cylindrical and no inner tube is disposed in the reaction tube 304.

Reactant fluid, such as the fluid output from the SMR, enters into an inlet 305 of the reaction channel 306 at a first end 310 of the WGS reactor 300 and flows along the reaction channel 306. A hydrogen generation reaction occurs along the reaction channel 306 in the presence of a WGS catalyst that is disposed in the reaction channel 306. The hydrogen generation reaction generates products (e.g., hydrogen gas and carbon dioxide) that are output from the reaction channel 306 via an outlet 307 at a second end 312 of the WGS reactor. For instance, the inlet 305 of the reaction channel 306 at the first end 310 of the WGS reactor 300 is in fluid communication with the outlet 220 of the SMR 200 (see FIG. 2A), and fluid output from the SMR is provided into the reaction channel 306 of the WGS 300. An example of the WGS hydrogen generation reaction is represented as follows:

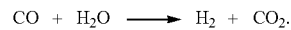

$$CO + H_2O \longrightarrow H_2 + CO_2.$$

The hydrogen generation reaction in the WGS 300 is an exothermic reaction. Heat generated by the hydrogen generation reaction in the WGS 300 is removed by cooling fluid, such as water, flowing along a cooling fluid channel 314 defined between the housing 302 of the WGS and the reaction tube 304. Cooling fluid can also flow through an inner cooling fluid channel 316 defined within the inner tube 308. The cooling fluid enters into an inlet of each the cooling fluid channel 314 and the inner cooling fluid channel 316 at the second end 312 of the WGS reactor 300, and exits from an outlet of each the cooling fluid channel 314 and the inner cooling fluid channel 316 at the first end 310 of the WGS reactor. The direction of flow of the fluid in the reaction channel 308 is from the first end 310 to the second end 312 of the WGS reactor 300; the direction of flow of the cooling flow is the opposite, from the second end 312 to the first end 310 of the WGS reactor 300. As the cooling fluid flows along the cooling fluid channel 314 and the inner cooling fluid channel 316, the cooling fluid is heated with heat from the fluid flowing along the reaction channel 308. In some examples, the cooling fluid is liquid water at the inlets and is heated such that the cooling fluid is steam, or a mixture of liquid water and steam, at the outlets.

Figure 4:
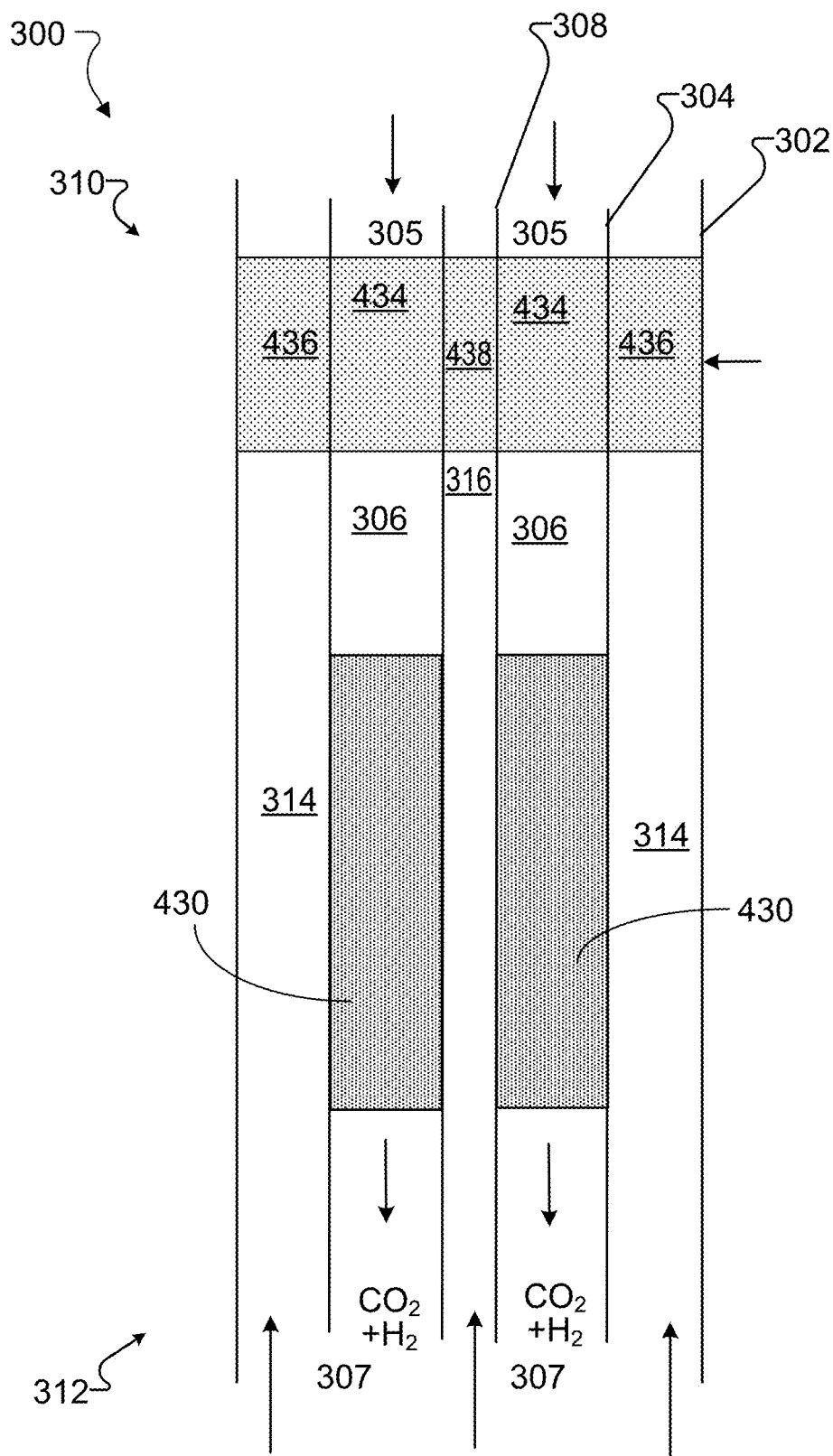
FIG. 4 is a diagram of a WGS reactor.

A WGS catalyst and a heat transfer material are disposed in the reaction channel 306 of the WGS reactor 300. The configuration of the WGS catalyst and the heat transfer material can be adjusted, e.g., to achieve a target throughput or hydrogen generation efficiency, to achieve operation in a target temperature range, or to achieve another goal. For instance, the position of the WGS catalyst and the heat transfer material along the reaction channel 306 can be adjusted. The structure and extent of the WGS catalyst and the heat transfer material can be adjusted. In the example of FIG. 3, the WGS reactor 300 is configured as a two-catalyst system with a heat transfer material 334 disposed between two WGS catalysts 330, 332. In the example of FIG. 4, the WGS reactor 300 is configured as a one-catalyst system, with a heat transfer material 434 and a single WGS catalyst 430. Other configurations of WGS catalysts and heat transfer materials are also possible.

In the two-catalyst configuration of the WGS reactor 300 shown in FIG. 3, a first WGS catalyst 330 and a second WGS catalyst 332 are disposed in the reaction channel 306. The first WGS catalyst 330 catalyzes the WGS hydrogen generation reaction in a first temperature range, e.g., between 200° C. and 450° C. The first WGS catalyst 330 can be a high temperature WGS catalyst that catalyzes the WGS hydrogen generation reaction at temperatures of, e.g., between 310° C. and 450° C. The first WGS catalyst 330 can be a medium temperature WGS catalyst that catalyzes the WGS hydrogen generation reaction at temperatures of, e.g., between 200° C. and 350° C. The reactants are input into the reaction channel 306 at a temperature within the first temperature range such that the first WGS catalyst 330 can catalyze the hydrogen generation reaction in the gas flowing across the first WGS catalyst 330.

The second WGS catalyst 332 is disposed further along the reaction channel 306 such that the distance between the first WGS catalyst 330 and the inlet 305 of the reaction channel 306 is less than the distance between the second WGS catalyst 332 and the inlet 305 of the reaction channel 306. Gas flowing along the reaction channel 306 flows across the first WGS catalyst 330 before flowing across the second WGS catalyst 332. The second WGS catalyst 332 catalyzes the WGS hydrogen generation reaction in a second temperature range that is lower than the first temperature range. For instance, the second WGS catalyst 332 catalyzes the WGS hydrogen generation reaction in a temperature range of, e.g., between 180° C. and 350° C. When the first WGS catalyst 330 is a high temperature WGS catalyst, the second WGS catalyst 332 can be a medium temperature WGS catalyst; or the second WGS catalyst 332 can be a low temperature WGS catalyst that catalyzes the WGS hydrogen generation reaction at temperatures of, e.g., between 180° C. and 250° C. When the first WGS catalyst 330 is a medium temperature WGS catalyst, the second catalyst 332 can be a low temperature WGS catalyst.

A heat transfer material 334 is disposed in the reaction channel 306 between the first WGS catalyst 330 and the second WGS catalyst 332, with the distance between the heat transfer material 334 and the inlet 305 of the reaction channel 306 being less than the distance between the second WGS catalyst 332 and the inlet 305 of the reaction channel 306. Fluid flowing along the reaction channel 306 first flows across the first WGS catalyst 330, then across the heat transfer material 334, and then across the second WGS catalyst 332. The heat transfer material 334 is in physical contact with the reaction tube 304, the inner tube 308, or both. The heat transfer material 334 facilitates in-situ transfer of heat from the fluid flowing along the reaction channel 306 (e.g., heat generated by the exothermic hydrogen generation reaction that occurs at the first catalyst 330) to the cooling fluid flowing along the cooling fluid channel 314, the inner cooling fluid channel 316, or both. This heat transfer reduces the temperature of the gas flowing along the reaction channel to the temperature range at which the second WGS catalyst 332 can catalyze the hydrogen generation reaction.

In some examples, an input side heat transfer material (not shown) is disposed in the reaction channel 306 such that fluid received into the reaction channel 306 flows across the input side heat transfer material prior to flowing across the first catalyst 330. This input side heat transfer material reduces the temperature of the fluid to the temperature range at which the first WGS catalyst 330 can catalyze the hydrogen generation reaction. For instance, when fluid from the SMR 200 (FIG. 2) is provided as input into the WGS 300 at a temperature that is too high for the first WGS catalyst 330, the input side heat transfer material reduces the temperature of the input fluid to the temperature range of the first WGS catalyst 330. In some examples, an output side heat transfer material (not shown) is disposed in the reaction channel 306 such that fluid flows across the output side heat transfer material after flowing across the second catalyst 332. This output side heat transfer material facilitates recovery of heat into the cooling fluid after completion of the WGS hydrogen generation reaction, enhancing the energy efficiency of the WGS reactor.

Heat transfer materials 336, 338 are disposed in the cooling fluid channel 314 and in the inner cooling fluid channel 316, respectively. Cooling fluid flowing along the cooling fluid channel 314 and the inner cooling fluid channel 316 flows across the heat transfer materials 336, 338, respectively. The heat transfer material 336 is in physical contact with the reaction tube 304 to facilitate transfer of heat from the fluid flowing along the reaction channel 306 to the cooling fluid flowing along the cooling fluid channel 314. The heat transfer material 338 is in physical contact with the inner tube 308 to facilitate transfer of heat from the fluid flowing along the reaction channel 306 to the cooling fluid flowing along the inner cooling fluid channel 316.

As the cooling flow flows along the cooling fluid channels 314, 316, the cooling fluid is heated by heat transfer from the fluid flowing along the reaction channel. In some examples, the heated cooling fluid is provided as input to the SMR 200 or returned as input to the reaction channel 306 of the WGS 300. For instance, the heated cooling fluid can be saturated water or two-phase water (liquid/steam) produced at a temperature and flow rate appropriate for input into the SMR.

In the configuration of the WGS reactor 300 shown in FIG. 3, the heat transfer materials 336, 338 are aligned with the heat transfer material 334. In some examples, the heat transfer materials 336, 338 are not aligned with the heat transfer material 334. The heat transfer materials 336, 338 can extend along some or all of the length of the cooling fluid channel 314 and inner cooling fluid channel 316, respectively. In some examples, only one of the heat transfer materials 336, 338 is present, or neither of the heat transfer materials 336, 338 is present.

The catalyst arrangement in the WGS reactor 300 enables activation and reduction of a single catalyst without affecting the other catalyst. In general, the catalyst(s) in the WGS reactor 300 are activated by slowly flowing a reducing gas across the catalyst at a slightly elevated temperature to reduce the catalyst to a metallic, active form. In some examples, the WGS catalyst(s) are activated externally prior to connection of the WGS to the SMR.

Referring to FIG. 4, the WGS reactor 300 is configured as a single-catalyst system in which a single WGS catalyst 430 is disposed in the reaction channel 306 of the WGS reactor 300. The WGS catalyst 430 catalyzes the WGS hydrogen generation reaction at temperatures of, e.g., between 200° C. and 450° C. The WGS catalyst 430 can be a high temperature WGS catalyst or a medium temperature WGS catalyst.

A heat transfer material 434 is disposed in the reaction channel 306 such that a distance between the heat transfer material 434 and the inlet 305 of the reaction channel 306 is less than the distance between the WGS catalyst 430 and the inlet 305 of the reaction channel 306. Fluid flowing along the reaction channel 306 first flows across the heat transfer material 434 and then flows across the WGS catalyst 430. The heat transfer material 434 is in physical contact with the reaction tube 304, the inner tube 308, or both, and facilitates the transfer of heat from the fluid received into the reaction channel 306 to the cooling fluid flowing along the cooling fluid channel 314, the inner cooling fluid channel 316, or both. This heat transfer reduces the temperature of the fluid to within a temperature range at which the WGS catalyst 430 can catalyze the WGS hydrogen generation reaction. For instance, when carbon monoxide output from the SMR 200 (FIG. 2) is provided as input into the WGS 300 at a temperature that is too high for the WGS catalyst 430, the heat transfer material 434 reduces the temperature of the input fluid to the temperature range of the catalyst 430.

Heat transfer materials 436, 438 are disposed in the cooling fluid channel 314 and in the inner cooling fluid channel 316, respectively, and facilitate heat transfer from the fluid flowing along the reaction channel 306 to the cooling fluid flowing along the cooling fluid channel 314 and the inner cooling fluid channel 316. In the configuration of the WGS reactor 300 shown in FIG. 4, the heat transfer materials 436, 438 are aligned with the heat transfer material 434. In some examples, the heat transfer materials 436, 438 are not aligned with the heat transfer material 434. The heat transfer materials 436, 438 can extend along some or all of the length of the cooling fluid channel 314 and inner cooling fluid channel 316, respectively. In some examples, only one of the heat transfer materials 436, 438 is present, or neither of the heat transfer materials 436, 438 is present.

The WGS catalysts 330, 332, 430 of FIGS. 3 and 4 can be pellets, beads, saddles, rings, or other structures formed of a catalyst material. The WGS catalysts 330, 332, 430 can be catalytic foams, foils, fins, or other structures that include a substrate and a catalyst material, e.g., with the catalyst material disposed on or integrated into the substrate. A catalytic foam is a porous structure through which one or more flow paths are defined. The porosity of the catalytic foam can be selected to achieve a high surface area, enabling efficient catalysis, as well as a low pressure drop across the catalytic foam, enabling efficient fluid flow along the reaction channel 306. For instance, the catalytic foam can have a porosity of between 5 ppi and 30 ppi. The material of the catalytic foam is non-reactive to the fluid (e.g., the reactants and products of the WGS hydrogen generation reaction) flowing along the reaction channel 306 in the temperature range at which the WGS 300 is operated. For instance, the catalytic foam can be a metal foam, such as copper or aluminum, or a silicon carbide film, or another suitable material. In the two-catalyst configuration of FIG. 3, the first and second WGS catalysts 330, 332 both can have the same structure, or each of the first and second WGS catalysts 330, 332 can have a distinct structure.

The heat transfer materials 334, 336, 338, 434 are materials having a thermal conductivity sufficient to enable heat transfer from the fluid flowing along the reaction channel 306 to the cooling fluid flowing along the cooling fluid channel 314 or the inner cooling fluid channel 316 or both. The heat transfer materials 334, 434 disposed in the reaction channel 306 are non-reactive to the fluid (e.g., the reactants and products of the WGS hydrogen generation reaction) flowing along the reaction channel 306 in the temperature range at which the WGS 300 is operated. For instance, the heat transfer materials 334, 434 can be a metal, such as copper or aluminum, or silicon carbide, or another suitable material.

The heat transfer materials 334, 336, 338, 434 can be foams, fins, foils, rings, saddles, beads, or pellets, or other structures capable of heat transfer. In the example of a foam, the porosity and length of the foam can be selected to achieve a high surface area, enabling efficient heat transfer, as well as a low pressure drop across the foam, enabling efficient fluid flow along the reaction channel 306. For instance, the heat transfer materials 334, 336, 338, 434 can be foams having a porosity of between 5 ppi and 30 ppi.

Referring to FIGS. 3 and 4, the flow rate of cooling fluid along the cooling fluid channels 314, 316 is controlled by a flow controller 340. The flow rate can be selected or adjusted based on the temperature of the fluid input into the reaction channel 306, the temperature of the cooling fluid input into the cooling fluid channels 314, 316. The flow rate can be selected or adjusted based on a target output temperature of the fluid output from the reaction channel 306, a target output temperature of the cooling fluid, or both. The flow rate can be selected or adjusted based on the catalyst configuration, the type of catalyst(s) (e.g., high-, medium-, or low-temperature WGS catalyst), or both. The flow rate can be selected or adjusted based on an actual or desired throughput.

Cooling of the fluid in the reaction channel 306 of the WGS reactor 300 enables the WGS hydrogen generation reaction to be carried out at high energy efficiency. The transfer of heat from the fluid in the reaction channel 306 to the cooling fluid cools the fluid in the reaction channel 306, e.g., removing heat generated during the exothermic hydrogen generation reaction and reducing the temperature of the fluid to an appropriate temperature range for the WGS catalyst(s), with no energy-intensive active cooling of the fluid. Moreover, the heat transfer in the WGS reactor enables isothermal conditions to be achieved, improving the conversion efficiency of the WGS hydrogen generation reaction.

Figure 5:
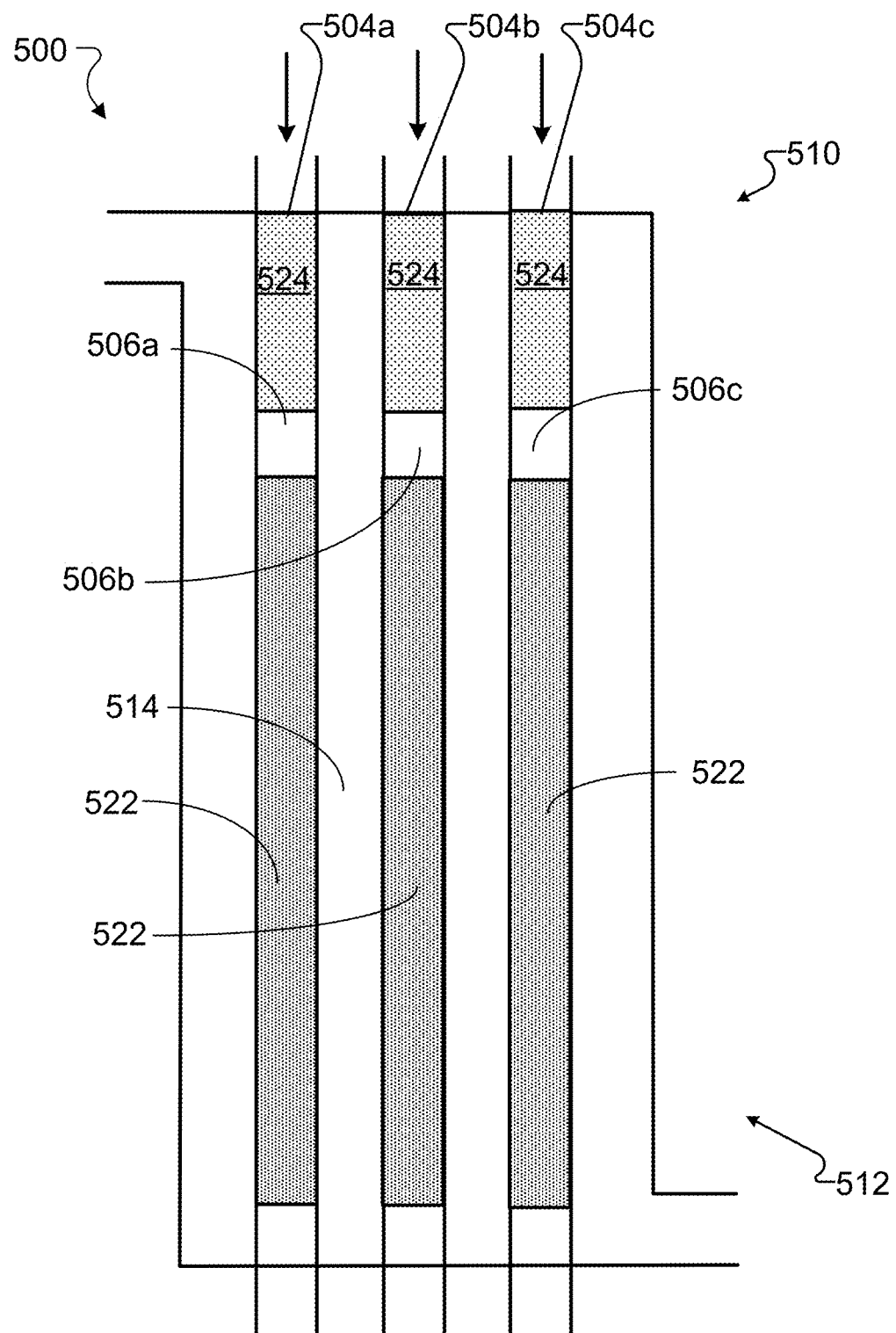
FIG. 5 is a diagram of a WGS reactor.

Referring to FIG. 5, a WGS reactor 500 includes multiple reaction tubes 504a-504c disposed in a housing 502. A reaction channel 506a-506c is defined within each reaction tube 504a-504c (collectively referred to as reaction tubes 504). Reactant gas flows into the reaction channels 506a-506c (collectively referred to as reaction channels 506) at a first end 510 of the WGS reactor 500, and product gas exits the reaction channels 506 at a second end 512 of the WGS reactor 500.

A cooling fluid channel 514 is defined in the space between the housing 502 and the reaction tubes 504. Cooling fluid enters into the cooling fluid channel 514 at the second end 512 of the WGS reactor and exits from the cooling fluid channel at the first end 510 of the WGS reactor 500.

In the example of FIG. 5, the WGS reactor 500 is a single-catalyst system, with a single catalyst 522, such a high temperature WGS catalyst or a medium temperature WGS catalyst, disposed in each reaction channel 506. A heat transfer material 524 is disposed in each reaction channels 506 to facilitate heat transfer from the gas in the reaction channel 508 to the cooling fluid in the cooling fluid channel 514. In some examples, the WGS reactor 500 including multiple reaction tubes can be configured as a two-catalyst system.

Figure 6:
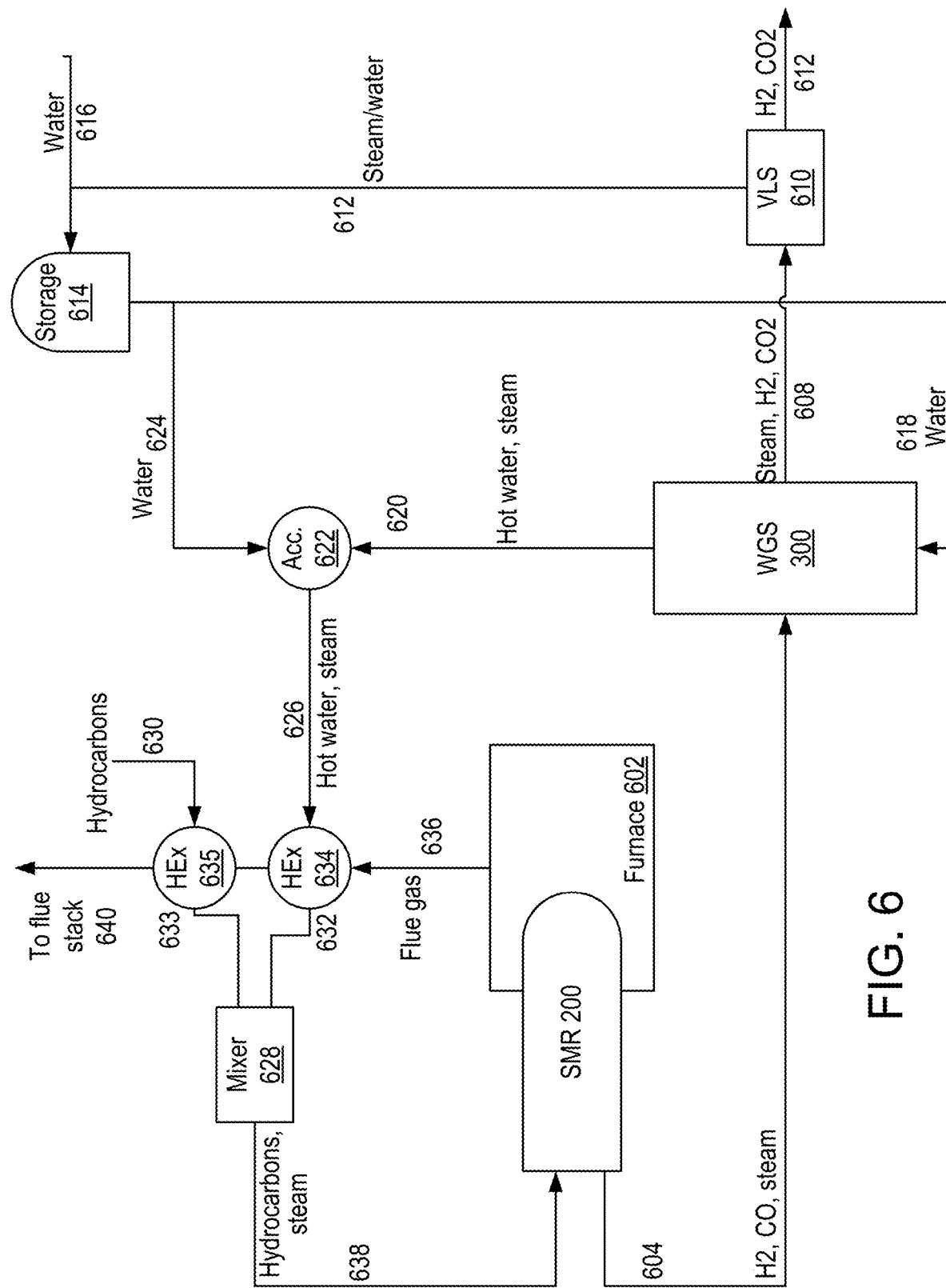
FIG. 6 is a diagram of a hydrogen generation system.

Referring to FIG. 6, the SMR 200 and WGS 300 are integrated into a system 600 for production of hydrogen gas (H2) from hydrocarbons. A combustion furnace 602 as the external heat source heating the first end of the SMR 200. The system 600 also can be implemented with the WGS 500, with an SMR including multiple sets of outer and inner tubes, or both.

The hydrogen generation reaction in the SMR 200 produces hydrogen gas (H2) and carbon monoxide (CO) from reactants including hydrocarbons and water vapor (steam) in the presence of a catalytic foam including an SMR catalyst. The hydrogen gas and carbon monoxide are output from the flow channel defined within the inner tube of the SMR onto an SMR product line 604 along with excess steam. The fluid (e.g., hydrogen gas, carbon monoxide, and steam) from the SMR 200 are provided as input to the reaction channel of the WGS 300. The outlet of the SMR 200 is in fluid communication with the inlet of the WGS 300 via the SMR product line 604. In some examples, additional steam is provided into the reaction channel of the WGS 300, e.g., from a water storage 614 (discussed infra) or from a cooling fluid output line 620 from the WGS 300 (discussed infra) to achieve a target ratio of steam to carbon monoxide.

As discussed supra, the fluid flowing along the flow channel toward the outlet of the SMR 200 is cooled by heat transfer with the incoming fluid flowing along the annular space of the SMR. The temperature of the fluid at the outlet of the SMR is thus at least partially controllable by the extent of heat transfer with the fluid in the annular space. The heat transfer, and thus the outlet fluid temperature, is affected by the configuration of the SMR 200 (e.g., the position, length, porosity, or other characteristics of the catalytic foam and the heat exchange foams) and by the operation of the SMR (e.g., the flow rate of fluid along the bayonet flow path of the SMR 200). The configuration, operation, or both of the SMR 200 can be adjusted to achieve heat transfer such that the fluid output from the SMR 200 is at a temperature appropriate for input into the reaction channel of the WGS 300. For instance, when the WGS 300 is configured with a high- or medium-temperature WGS catalyst toward the input of the reaction channel, the SMR 200 can be configured such that the carbon monoxide and steam arrive at the reaction channel of the WSG 300 with a temperature in the range at which the WGS catalyst is active. By making use of heat transfer within the SMR 200 to achieve a target temperature for fluid output from the SMR, external, active cooling devices are not used between the SMR 200 and the WGS 300, and the role of external, active heating devices (e.g., the furnace 602) can be reduced, thus contributing to high energy efficiency of the system-level hydrogen generation process.

The hydrogen generation reaction in the WGS 300 produces hydrogen gas and carbon dioxide (CO2), which are output from the reaction channel of the WGS 300 onto a WGS product line 608 along with excess steam. The excess steam is removed from the fluid on the WGS product line 608 in a vapor liquid separator (VLS) 610. The remaining hydrogen gas and carbon dioxide are sent downstream 611 for separation, with the carbon dioxide discarded (e.g., via a flue stack, discussed infra) and the hydrogen gas removed to a hydrogen storage, e.g., for use as fuel. The separated steam flows along a steam line 612 to a water storage 614, which also stores water provided from an external water source 616. The separated steam on the steam line 612, the water from the external water source 616, or both can be treated before storage in the water storage 614.

Water from the water storage 614 is provided along a cooling fluid line 618 as cooling fluid input into the WGS 300. The heated cooling fluid output from the WGS 300, which is a mixture of liquid water and steam, flows along a cooling fluid output line 620. The heated cooling fluid will ultimately be provided as an input reactant into the SMR 200. The temperature of the heated cooling fluid output from the WGS 300 is affected by the configuration of the WGS 300 (e.g., the type, position, or other characteristics of the WGS catalyst and the heat transfer material(s)) and by the operation of the WGS 300 (e.g., the flow rate of fluid along the reaction channel and the flow rate of cooling fluid). The configuration, operation, or both of the WGS 300 can be adjusted such that the heated cooling fluid is output at a target temperature, such as a temperature sufficient for input into the SMR 200. By heating the cooling fluid to a target temperature using recovered heat from the fluid in the WGS 300 reaction channel, external, active heating elements to heat the SMR input fluid are not used. In addition, external, active cooling are not used to remove heat from the exothermic WGS hydrogen generation reaction. The use of recovered heat to heat the SMR input fluid and the cooling of the exothermic WGS hydrogen generation reaction contributes to high system-level energy efficiency.

The heated cooling fluid output from the WGS 300 flows along the cooling fluid output line 620 to an accumulator 622. The accumulator 622 also receives additional water from the water storage 614 along a water line 624. Steam and water output from the accumulator 622 onto an accumulator output line 626 is heated in a heat exchanger 634 with heat from flue gases 636 from the combustion furnace 602. Hydrocarbons provided via a hydrocarbon line 630 are heated in a heat exchanger 635 with heat from the flue gases 636. The heated steam and hydrocarbons 632, 633, respectively, are mixed in a mixer 628 and output onto an SMR input line 638, which feeds the heated steam and hydrocarbons to the inlet of the outer tube of the SMR 200. The use of recovered heat from the flue gases 636 to heat the mixture of steam and hydrocarbons to a temperature sufficient for input into the SMR contributes to high system-level energy efficiency. In this configuration, the outlet of the WGS cooling fluid flow channels is in fluid communication with the inlet of the SMR 200 such that the heated WGS cooling fluid ultimately is provided as a component of the fluid input into the SMR 200. The flue gases 636, after passing through the heat exchanger 634, are discarded to a flue gas stack 640.

Figure 7:
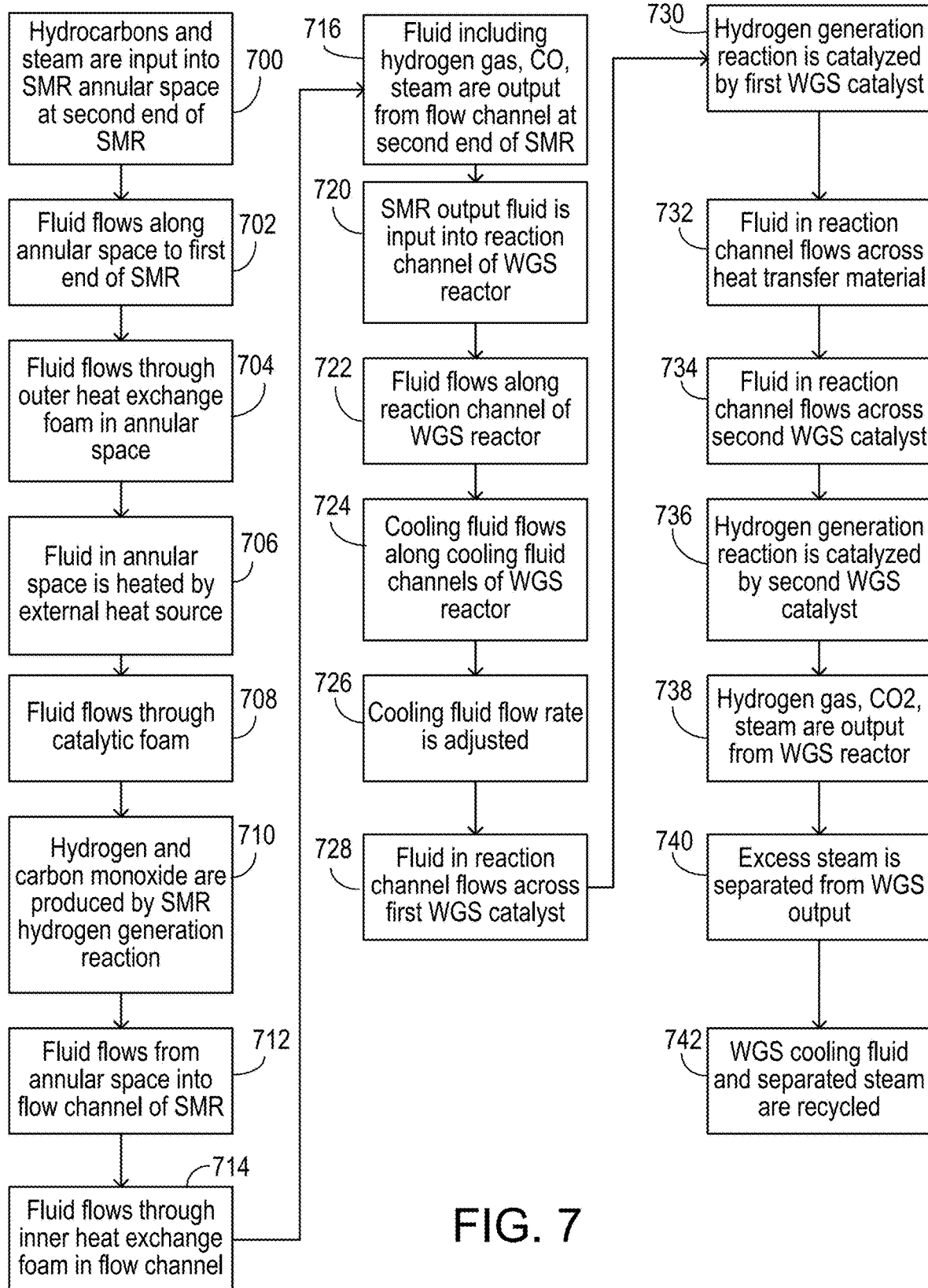
FIG. 7 is a process flow chart.

Referring to FIG. 7, in operation of a hydrogen generation system including an SMR and a WGS reactor, a fluid (e.g., a gas) including reactants is provided as input (700) to an SMR. Specifically, the fluid is provided into an inlet of an annular space of the SMR at a second end of the SMR, with the annular space being defined between an outer tube and an inner tube of the SMR. The fluid provided to the inlet includes hydrocarbons, e.g., methane, natural gas, biogas, methanol, or other hydrocarbons. The fluid provided to the inlet also includes steam.

The fluid flows along a bayonet flow path of the SMR. Specifically, the fluid flows (702) along the annular space from the second end to the first end of the SMR. Along the annular space, the fluid flows through an outer heat exchange foam (704) that facilitates heat transfer from high-temperature fluid flowing along a flow channel defined in the inner tube of the SMR to the lower-temperature fluid flowing along the annular space. The outer heat exchange foam also can induce turbulent flow in the fluid flowing along the annular space, enhancing the heat transfer efficiency.

The fluid flowing along the annular space is heated (706) by an external heat source, such as a combustion furnace, toward the first end of the SMR. In the heated region of the SMR, the fluid flows through a catalytic foam (708), which catalyzes the SMR hydrogen generation to produce hydrogen gas and carbon monoxide from the hydrocarbon and steam reactants (710). The catalytic foam facilitates heat transfer to the gas flowing therethrough, e.g., heat transfer from higher-temperature product fluid flowing along the flow channel within the inner tube of the SMR and heat transfer from the external heat source.

The fluid, now at higher temperature and including hydrogen and carbon monoxide, flows (712) from the annular space into the flow channel at the first end of the SMR. The fluid in the flow channel flows from the first end of the SMR toward the second end of the SMR, opposite the direction of flow of fluid in the annular space. The fluid in the flow channel flows through an inner heat exchange foam (714) that facilitates heat transfer from high-temperature fluid flowing along the flow channel to the lower-temperature fluid flowing along the annular space. The inner heat exchange foam also can induce turbulent flow in the fluid flowing along the flow channel, enhancing the heat transfer efficiency. The presence of an elongated baffle in the inner tube also enhances heat transfer efficiency.

When the fluid flowing along the flow channel reaches the SMR outlet, the fluid (including hydrogen gas, carbon monoxide, and steam) is output from the SMR (716) at the second end of the SMR. The SMR output fluid is provided as input into a reaction channel of a WGS reactor (720). The heat transfer between fluid flowing along the annular space and fluid flowing along the flow channel in the SMR can result in the carbon monoxide being at a temperature sufficient for input into the WGS reactor, such as a temperature in or above a temperature range at which a WGS catalyst can catalyze the WGS hydrogen generation reaction. For instance, the fluid output from the SMR and provided as input into the reaction channel of the WGS reactor is at a temperature of between 200° C. and at least 450° C.

Fluid including carbon monoxide and steam flow along the reaction channel of the WGS reactor (722), flowing across one or more WGS catalysts and one or more heat transfer materials. Cooling fluid, such as water, flows along one or more cooling fluid channels (724). The direction of fluid flow along the reaction channel is opposite the direction of fluid flow along the cooling fluid channels. The flow rate of the cooling fluid can be adjusted (726), e.g., based on a flow rate of the fluid flow along the reaction channel (e.g., which is based on throughput of the SMR), based on a target output temperature for the cooling fluid, or based on a configuration or operation of the WGS.

In the example of FIG. 7, the WGS reactor is configured as a two-catalyst system, e.g., as shown in FIG. 3. The fluid in the reaction channel flows across a first WGS catalyst (728), e.g., a high-temperature or medium-temperature WGS catalyst. The first WGS catalyst catalyzes the WGS hydrogen generation reaction in a first temperature range (730), e.g., between 200° C. and 450° C., to produce hydrogen gas and carbon dioxide. The fluid in the reaction channel then flows across a heat transfer material disposed in the reaction channel (732). The heat transfer material reduces the temperature of the fluid to a second temperature range in which a second WGS catalyst operates by heat transfer to the cooling fluid flowing in the cooling fluid channel(s). The heat transfer raises the temperature of the cooling fluid, e.g., to between 100° C. and 300° C. The fluid in the reaction channel, now in the second temperature range, flows across a second WGS catalyst (734), e.g., a medium-temperature or low-temperature WGS catalyst. The second WGS catalyst catalyzes the WGS hydrogen generation reaction in a second temperature range (736) lower than the first temperature range, e.g., between 180° C. and 250° C. to produce hydrogen gas and carbon dioxide.

Fluid, including hydrogen gas, carbon dioxide, and excess steam, is output from the reaction channel of the WGS reactor (738). The excess steam is separated (740) and the separated steam, along with cooling fluid (e.g., a mixture of steam and liquid water) from the WGS reactor, are recycled (742) to be used, e.g., as input into the WGS reaction channel or as input into the SMR.

EXAMPLES

Simulations and experiments of heat transfer in an SMR were performed to evaluate the role of catalytic foam in transferring heat from the external heat source to the fluid flowing along the annular space of the SMR.

Figure 8:
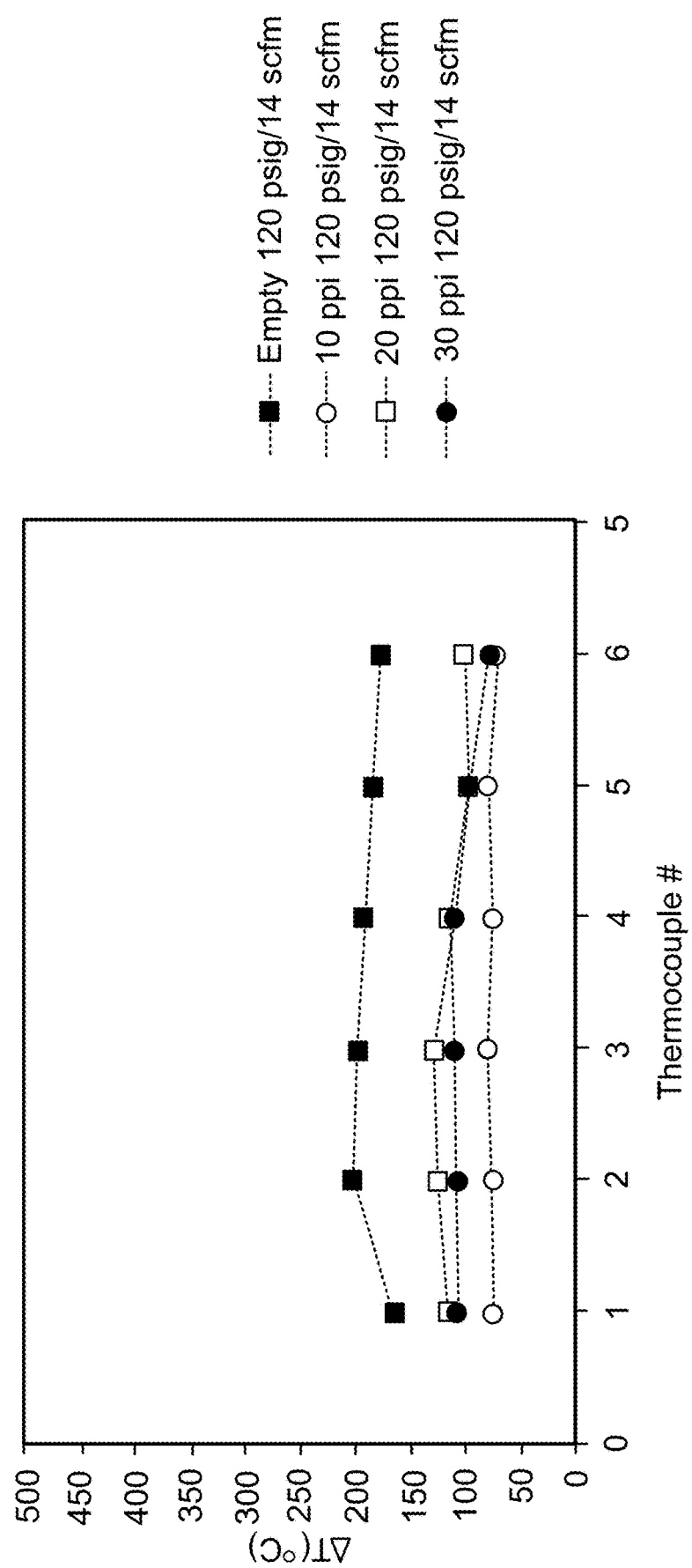
FIG. 8 is a plot of the temperature differential between the inner and outer tubes of an SMR.

Referring to FIG. 8, foams of differing porosities were disposed in the annular space of an SMR. For each foam type, the SMR was heated to 400° C. and the temperature differential between the outer tube and the inner tube was measured by thermocouple. The temperature differential for each of three foams (10 ppi, 20 ppi, and 30 ppi), and the temperature differential for an empty annular space (no foam) is shown in FIG. 8. A lower temperature differential indicates temperature equilibration due to heat transfer. The measured temperature differential between outer and inner tubes was about 50° C. greater when no foam was used than when a foam was present, indicating lack of heat conduction without foam and effective heat conduction with foam.

Figure 9A:
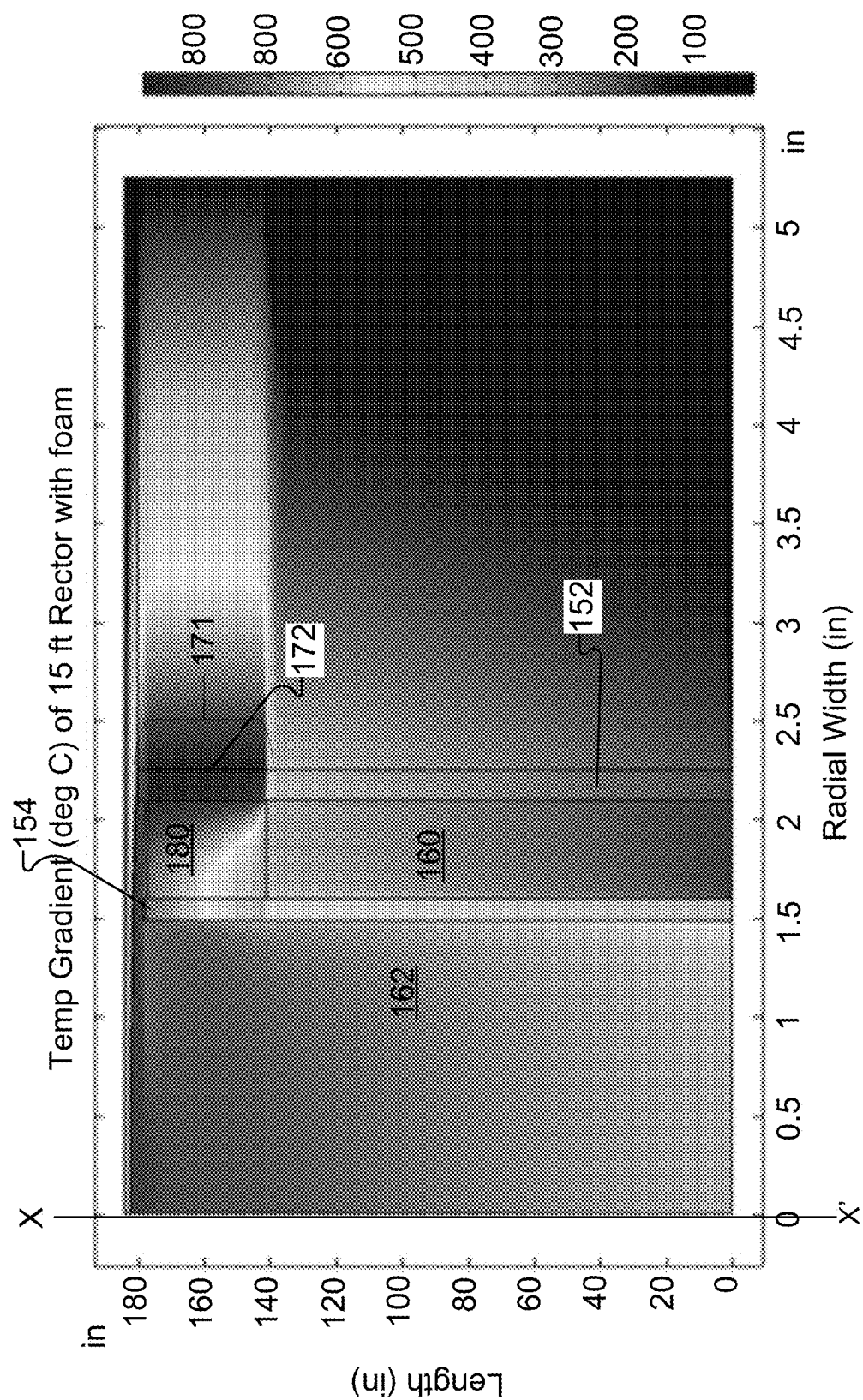
FIGS. 9A and 9B are simulations of heat transfer in an SMR with and without a foam, respectively.
Figure 9B:
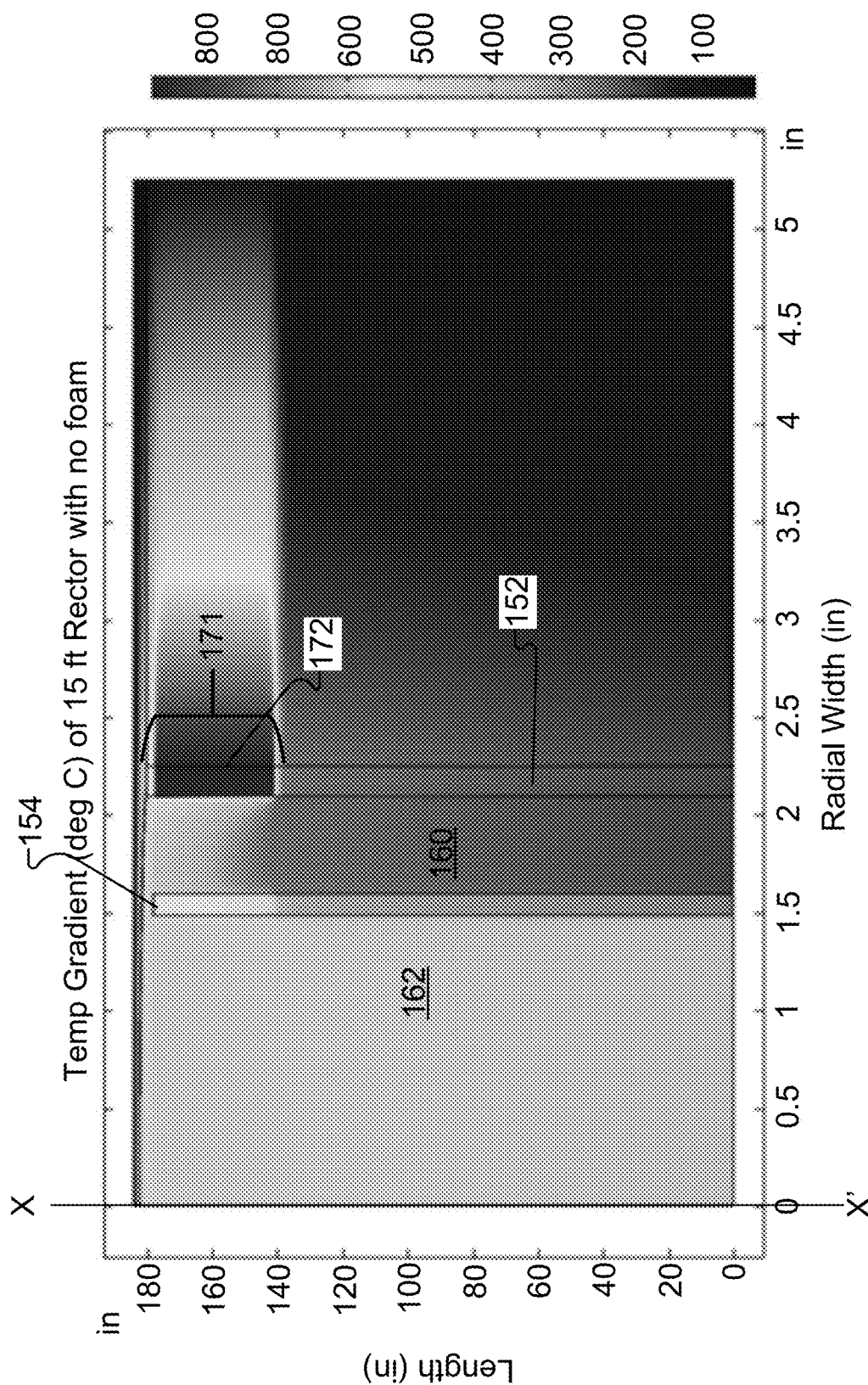

Referring to FIGS. 9A and 9B, the heat transfer characteristics of an SMR 150 were simulated to demonstrate the effect of foam on heat transfer from an external heat source into the SMR. The SMR 150 has an outer tube 152 and an inner tube 154, with an annular space 160 defined between the outer tube 152 and the inner tube 154, and a flow channel 162 defined within the inner tube 152. FIGS. 9A and 9B show a cross section of only half of the SMR; the axis X-X' is the axis along the center of the flow channel 162. An external heat source 172 supplies heat to a heated portion 171 of the SMR. In FIG. 9A, a foam 180 is disposed in the annular space 160. In FIG. 9B, no foam is present in the annular space (FIG. 9B). Other parameters, including inlet fluid flow rate, inlet fluid temperature, annular width, and tube dimensions, were the same. The heat source 172 was simulated as a section of the outer tube 152 maintained at 875° C. As can be seen from FIGS. 9A and 9B, with the foam 180 present in the annular space 130 (FIG. 9A), the fluid in the annular space 160 reached a temperature of over 760° C., while in the SMR without foam (FIG. 9B), the fluid in the annular space 160 reached a temperature of only 450° C. The foam 180 present in the annular space also resulted in increased temperature of the fluid in the flow channel 162 within the inner tube 152, e.g., by heat transfer and by flow of heated fluid from the annular space 160 into the flow channel 162. These results demonstrate the effective heat transfer provided by foam disposed in the annular space of an SMR.

Particular embodiments of the subject matter have been described. Other embodiments are within the scope of the following claims.

What is claimed is:

1. A method for producing hydrogen, the method comprising:
    flowing a first gas along a bayonet flow path of a steam methane reformer (SMR) to produce a first product, comprising flowing the first gas through a foam disposed along the bayonet flow path;
    providing the first product produced in the SMR to an input of a water gas shift (WGS) reaction channel defined within a reaction tube of a WGS reactor; and
    flowing a second gas comprising the first product through the WGS reaction channel to produce a second product, in which flowing the second gas comprises:
        flowing the second gas across a heat transfer material disposed in the WGS reaction channel to reduce the temperature of the flowing second gas; and
        flowing the second gas across a WGS catalyst disposed in the reaction channel.

2. The method of claim 1, wherein flowing the first gas along the bayonet flow path of the SMR comprises flowing the first gas from an annular space into an SMR flow channel, wherein the annular space is defined between an outer tube and an inner tube disposed within the outer tube and the SMR flow channel is defined within the inner tube.

3. The method of claim 2, wherein flowing the first gas along the bayonet flow path of the SMR comprises flowing the first gas from an inlet at a second end of the outer tube, along the annular space toward a first end of the outer tube, along the SMR flow channel defined within the inner tube, and to an outlet at a second end of the inner tube.

4. The method of claim 2, comprising heating the first gas flowing along the annular space with heat from the gas flowing along the flow channel defined within the inner tube.

5. The method of claim 1, wherein flowing the first gas through a foam disposed along the bayonet flow path comprises flowing the gas through a catalytic foam.

6. The method of claim 1, comprising flowing a cooling fluid through a cooling fluid flow pathway defined between a housing of the WGS reactor and the reaction tube of the WGS reactor.

7. The method of claim 6, wherein contacting the flowing second gas to the heat transfer material disposed in the WGS reaction channel comprises transferring heat from the flowing second gas to the cooling fluid.

8. The method of claim 7, comprising heating the cooling fluid to a temperature of between 100° C. and 300° C.

9. The method of claim 6, comprising providing heated cooling fluid from the cooling fluid flow pathway to an input of the bayonet flow path of the SMR.

10. The method of claim 6, comprising providing heated cooling fluid from the cooling fluid flow pathway to an input of the WGS reaction channel.

11. The method of claim 6, comprising adjusting a flow rate of the cooling fluid through the cooling fluid flow pathway based on a rate at which the first product is provided to the input of the WGS reaction channel.

12. The method of claim 1, comprising providing the first product to the input of the WGS reaction channel at a temperature equal to or greater than a temperature at which the WGS catalyst structure catalyzes a hydrogen generation reaction.

13. The method of claim 12, comprising providing the first product to the input of the WGS reaction channel at a temperature of between 200° C. and 450° C.

14. The method of claim 1, wherein flowing the second gas across the WGS catalyst comprises:
    flowing the second gas across a first WGS catalyst disposed in the WGS reaction channel, wherein the first WGS catalyst is configured to catalyze a hydrogen generation reaction in a first temperature range; and
    flowing the second gas across a second WGS catalyst disposed in the reaction channel, wherein the second WGS catalyst is configured to catalyze the hydrogen generation reaction in a second temperature range lower than the first temperature range.

15. The method of claim 14, comprising flowing the second gas across the heat transfer material after flowing the second gas across the first WGS catalyst.

16. The method of claim 1, wherein flowing the second gas to the heat transfer material comprises reducing the temperature of the flowing second gas to a temperature at which the WGS catalyst is capable of catalyzing a hydrogen generation reaction.

17. The method of claim 1, comprising flowing the first gas along the bayonet flow path of the SMR to produce carbon monoxide and hydrogen.

18. The method of claim 17, wherein providing the first product to the input of the WGS reaction channel comprises providing carbon monoxide to the input of the WGS reaction channel.

19. The method of claim 1, comprising flowing the second gas along the WGS reaction channel to produce carbon dioxide and hydrogen.

* * * * *